United States Patent [19]
Turner et al.

[11] Patent Number: 5,689,239
[45] Date of Patent: Nov. 18, 1997

[54] IDENTIFICATION AND TELEMETRY SYSTEM

[75] Inventors: Leigh Holbrook Turner, Singapore, Singapore; Peter Harold Cole, South Australia, Australia

[73] Assignee: Integrated Silicon Design Pty. Ltd., South Australia, Australia

[21] Appl. No.: 204,271

[22] PCT Filed: Sep. 9, 1992

[86] PCT No.: PCT/AU92/00477

§ 371 Date: Mar. 8, 1994

§ 102(e) Date: Mar. 8, 1994

[87] PCT Pub. No.: WO93/05489

PCT Pub. Date: Mar. 18, 1993

[30] Foreign Application Priority Data

Sep. 10, 1991 [AU] Australia .................... PK8276

[51] Int. Cl.[6] .................................. H04Q 9/00
[52] U.S. Cl. ............... 340/572; 340/825.54; 340/825.34; 340/551; 340/505; 235/383; 235/385; 283/85
[58] Field of Search ............... 340/870.12, 572, 340/551, 825.54, 505, 568; 343/742, 867; 342/51; 235/385, 383, 474; 283/85, 74, 82, 72; 365/101, 230.06

[56] References Cited

U.S. PATENT DOCUMENTS

| | | | |
|---|---|---|---|
| 3,780,368 | 12/1973 | Northeved et al. | 342/44 |
| 4,274,090 | 6/1981 | Cooper | 340/572 |
| 4,308,530 | 12/1981 | Kip et al. | 340/572 |
| 4,635,041 | 1/1987 | Maimann et al. | 340/572 |
| 5,019,813 | 5/1991 | Kip et al. | 340/825.54 |
| 5,105,109 | 4/1992 | Kip et al. | 340/825.54 |
| 5,126,749 | 6/1992 | Kaltner | 343/742 |

FOREIGN PATENT DOCUMENTS 0387071  9/1990  European Pat. Off. .

*Primary Examiner*—Jeffery Hofsass
*Assistant Examiner*—Albert K. Wong

[57] ABSTRACT

The present invention relates to a system for automated identification of articles such as baggage or carrier cargo wherein an electronic sub system called an interrogator including a transmitter and receiver extracts by electromagnetic means useful information from an electronically coded label attached to such items as they are processed through the sorting operations at an airport or node of an article handling organization.

13 Claims, 17 Drawing Sheets

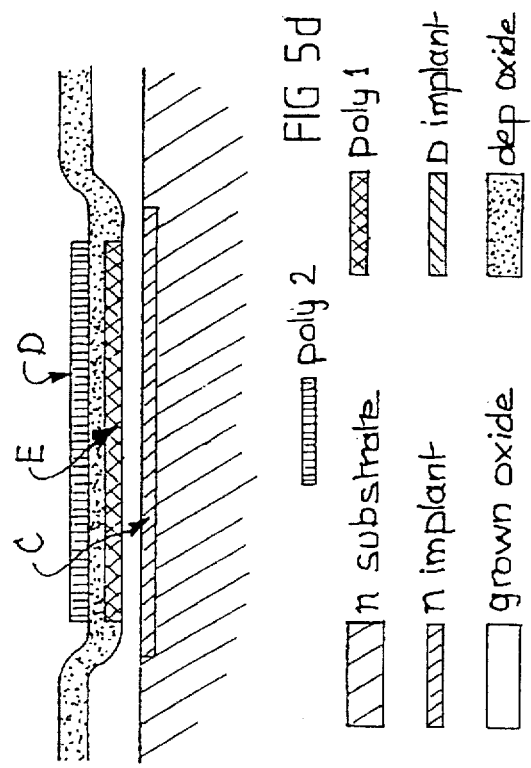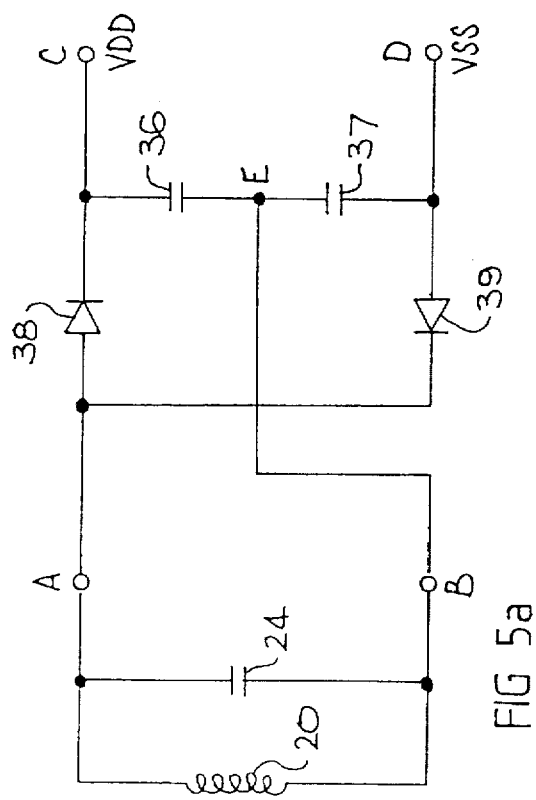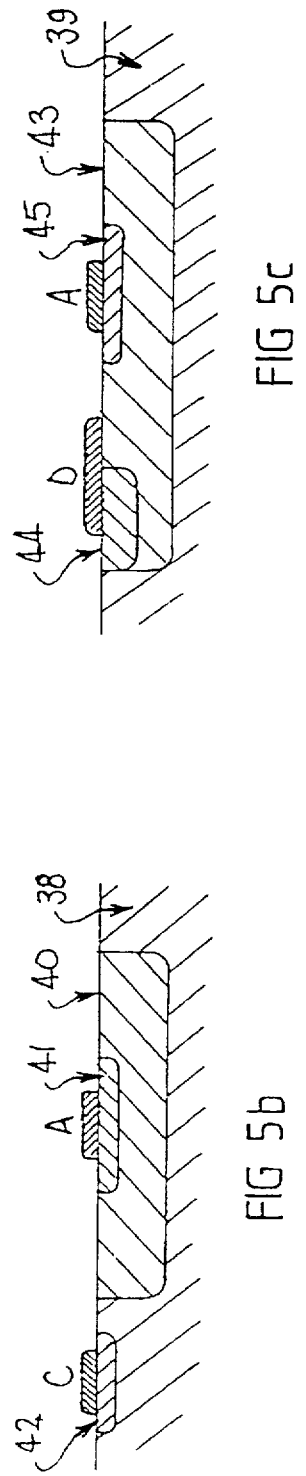

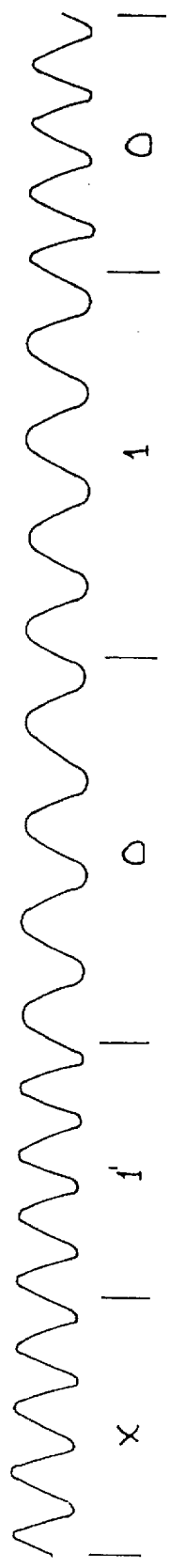

IDENTIFICATION AND TELEMETRY SYSTEM

The present invention relates to a system for automated identification of articles such as baggage or carrier cargo wherein an electronic sub system called an interrogator including a transmitter and receiver extracts by electromagnetic means useful information from an electronically coded label attached to such items as they are processed through the sorting operations at an airport or node of an article handling organisation.

Although the present invention is herein described with reference to a baggage or cargo sorting system, it is to be appreciated that it is not thereby limited to such applications. Thus the identification system may be applied to material handling operations generally e.g. the sorting of stock or parts, or to personnel or animal identification or accreditation.

An illustration of the type of system to which the invention relates is shown in FIG. 1. This system uses the principle of electromagnetic communication in which an interrogator 1 containing a transmitter 2 generates an interrogation signal which is conveyed to an electromagnetic field creation system 3 to provide an interrogation field 4 which is coupled to an electronically coded label 5 attached to an object 6 which may be moving on a conveyor 7.

The label contains an electromagnetic coupling element and an electronic circuit which may use a rectifier to generate a dc power supply for operation of a reply generation circuit within the label. That circuit produces a reply signal, containing information previously encoded into the label, which either through the said electromagnetic coupling element or a separate coupling element, generates in the vicinity of the label a reply electromagnetic field 8.

As a result of the electromagnetic coupling between the reply field and either the field creation system 3 or a separate field detection system 9, a portion of the reply signal generated by the label enters the interrogator, and in a signal separator 10 which may be located within or exterally to the interrogator may be separated from the interrogation signal and passed to a receiver 11 wherein is amplified, and decoded to determine the information encoded into the reply.

The decoded information may be further processed in a micro-controller 12 or larger computer to generate, possibly with the aid of information contained in a data base, signals to a system of sorting gates which may control the movement of the object.

Practical applications of the system include the sorting of airline baggage or other cargo, security validation of the entry of objects into defined areas, an example being the loading on to aircraft only of articles which are known to accompany passengers who have already boarded, the provision of security in the collection of objects being re-delivered to customers, the determination that objects intended to remain grouped have been successfully handled to preserve the intended grouping, control of the entry of personnel into secured areas, and identification of livestock in animal management systems.

In the design of practical systems for cargo and baggage handling several problems can arise. One is that objects to be sorted may be closely spaced or may even overlap, and as a result more than one label may be simultaneously present in the interrogation field. Replies from such simultaneously present labels can interfere with one another so that errors in reading of label data or failure to read label data can occur.

A further problem is caused by the fact that not only is it necessary to determine the identification of all objects which are present during the passage of an object on the conveyor through the interrogation field, but it is also necessary for sorting purposes to determine the order in which they are presented on the conveyor even when they are closely spaced.

A further problem can arise from the orientation sensitivity of the generally magnetic field sensitive labels and the fact that the electromagnetic field generation system may have symmetry planes or conducting planes, within which both the magnetic field and the frequently planar antenna structure may lie, so that there is little or no coupling between them.

Further problems in the design of practical interrogation systems are: that of insuring that the required interrogation field strength is generated with conveniently small interrogator power; that the field is in directions which will couple to all labels as they pass through the field for a sufficient time for one or more readable replies to be generated; and that the field creation systems present to the signal generation systems within the interrogator and the coupling cables to them suitable impedances for efficient and convenient power transfer.

Further problems arise from the needs to ensure that the interrogation field creation system does not provide undue interference to other users of the electromagnetic spectrum, that the weak replies provided by the labels do not receive undue interference from external sources, and that there is a low level of injection of electrical noise into the interrogator receiver as a result of the conveyor and is propulsion system modulating the interrogation field.

Further problems in the design of such identification systems occur in the design of the label. There is requirement that the label coupling element be inexpensive to manufacture, and that the microcircuit within the label occupy minimum area and have a minimum number of connections between the microcircuit and the label coupling element, so that it may be inexpensively produced.

There is also a need to ensure that the circuit in the label will operate over a large range of signal strengths. This requirement derives form the fact that some labels can have an unfavourable orientation to the interrogation field, or the interrogation field may be perturbed by the passage of the labelled object or other objects so that it is weakened in the vicinity of one or more labels, while other labels which pass close to and with a favourable orientation to the interrogation field creation means may receive very strong signals.

Problems in the successful commercial application of object identification systems lie in the way in which information must be imparted to the label. Although there are cost advantages in manufacturing labels with a predetermined information content, it is frequently required that the label code be written at the time the label is issued, and be written with information which is not available until that time. To minimise the costs of manufacture and of deployment of such labels it is frequently a requirement that encoding be performed by non-contact electromagnetic coupling means and via means which-do not complicate the manufacturing processes of connection of the microcircuit to the label coupling element.

Further problems arise in the economical manufacturing of label microcircuits. One problem is that the inclusion of all functions required in a label, such as remote programming, generation of the label reply, and the performance of timing operations in the label, are normally realised with circuits and components which occupy considerable area. Another problem lies in the usual choice of interrogation frequency in the low radio or sub-radio frequency region, which choice results in a requirement for label coupling elements of many turns and possibly a requirement for the placement of label coupling element resonating capacitors externally to the label circuit. Another problem resides in the requirement in programmable labels for a multiplicity of connections between the label circuit and other components within the label. A further problem lies in the need to place additional connecting pads on the label circuit for the purpose of initial circuit testing or to bring all memory cells, which upon manufacture have unpredictable contents, to an appropriate initial state. All of these problems lead to an increase in label circuit area and the complexity of connections between the label circuit and label body, and contribute to the elevation of label manufacturing costs.

An additional problem arises from the need to ensure that the entire identification system including the field creation means, and the field confinement system if present, are compatible with the configuration of existing conveyor systems so that extensive modification of the latter is not required.

The present invention provides for the successful interrogation, with low interrogator power and independently of label orientation, in structures which are easily fitted to existing baggage handling systems, and avoiding both interference from conveyor noise and also avoiding interference to or from other users of the electromagnetic spectrum, of electronic labels of low manufacturing cost, of economical and convenient proximity programming processes, and possessing security against unauthorised re-programming, attached to closely spaced or overlapping objects in the interrogatin field, with the correct determination of the order of closely spaced objects.

The present invention may provide electronic labels which furnish intermittently repeated reply signals, separated by periods of reply inactivity. The invention may provide for variation of the periods of silence between labels with label environment, or with variation of interrogation power, as to avoid permanent overlapping or replies from labels simultaneously present in the interrogation field.

The invention may provide for a label circuit in which the time between replies from a given label increases with interrogation field strength so as to enhance the detection of weak replies through the reduction of competition from strong replies. The invention may provide within labels for circuits which are designed to ensure the reduction of reply sub-carrier generation during the periods between label replies.

The invention may provide an interrogation field creation system and reply field detection system both without planes parallel to the direction of motion of the conveyor in which a null response orientation for a label is maintained over the length of the interrogation region. The invention may provide a field creation and detection system with screening to minimise interference to and from other users of the electromagnetic spectrum, and may also provide a field creation and detection system allowing simple firing without modification to existing conveyor systems.

The invention may also provide field creation and detection systems which are immune to conveyor noise, which provide good electrical coupling between spatially separate sections of the field creation system, and which provide for the minimisation of unwanted electric field creation and radiation. The invention may also provide a field creation and detection system with a single feed point and a built-in transformation of feeding impedance to a convenient level, and built-in balanced to unbalanced line transformation.

The invention may provide for the recording of the profile of label reply signal strengths as a label moves through the interrogation region, combined with the analysis of that profile to determine label position. The invention may provide a field creation and detection system with rapid positional variation of the strength of various field components for the better determination of label position on the conveyor. The invention may provide both primary and secondary creation and detection systems from which a plurality of reply signal profiles may be obtained to enhance the determination of label position. The invention may also provide an auxiliary label illumination system, together with sensing means on the label and label circuits to ensure that labels reply only when they are within the auxiliary illumination field or circuits which include within the label reply the results of such sensing, to further enhance the determination of label position.

The invention may also provide multiple short-range field creation and detection systems which in conjunction with a matching interrogator produces closely defined label position determination.

The invention may provide a label with an inexpensive to manufacture coupling element and an inexpensive to manufacture label circuit. The invention may also provide a label circuit which allows for proximity programming and for proximity programming while maintaining a minimum number of connections between the label coupling element and the label circuit, with consequent economies in manufacturing cost.

The invention may provide a programming data and clock recovery circuit within the label which derives its input only from the single interrogation power supply and reply port of the label circuit. The invention may also provide for convenience and economy in the first programming, for the elimination of the need for initialisation of the label memory circuit or for test of that circuit at the wafer level upon manufacture, with further consequential economies in manufacturing cost. The invention may provide for the protection against inadvertent or unauthorised re-programming, this protection being obtained with a high degree of security.

The invention may provide a label circuit containing a switched load module with matched static and dynamic load characteristics which enhances the dynamic range over which the label will provide satisfactory replies and the range of field strengths to which the label may be safely exposed. The invention may provide a label circuit with a rectifier which enhances the ratio of dc power supply achieved to the peak inverse voltage of the diodes available within the manufacturing process, so that the label dynamic range may be further enhanced with further benefits as stated above.

The invention may also provide an implementation of a label rectifier circuit which realises a plurality of power supply reservoir capacitors within the same plan area with the result that the necessary rectifier reservoir capacitance may be obtained while maintaining small circuit size and low manufacturing costs.

The invention may provide for the on-label derivation of a memory programming voltage by a charge pump structured so as to exploit for the most stressed diodes in the circuit the p-n junction with the dopings which produce the largest breakdown voltage.

The invention may also provide for the on-label derivation of programming voltage by a compact voltage doubler rectifier circuit superimposed upon the normal operating power supply. The invention may provide for the enhancement of operating and programming voltages during programming by the automatic disabling during programming of the effect of limiting circuits which have been installed with a view to enhancing reply dynamic range.

The invention may provide a label circuit with built-in reply sub-carrier oscillator to minimise power consumption in high frequency divider circuits. The invention may also provide a reply sub-carrier clock generation circuit which uses switched current sources to avoid the requirement for difficult-to-integrate resistors and in order to provide a reply circuit which operates at a low power.

The invention may provide a reply interval generation circuit which uses switched multiply mirrored current sources to avoid the requirement for difficult to integrate resistors and to economise on label operating power. The invention may provide for different dependencies of such sources upon supply voltage to produce an increase of reply interval with increase in interrogation signal strength.

The invention may provide a label circuit mode control block which assures a reliable start to reply operations, and convenient recognition of the transition between reply and programming operations.

The invention may provide a label circuit state control machine which avoids the need for analog long-period timing circuits and which may also provide for less frequent replies from labels in strong interrogation fields.

The invention may provide in the label circuit an ac amplifier which realises extended low frequency response, and controlled gain, while making use of components of small physical size.

The invention may provide a label which employs high frequency divider circuits to permit a reply carrier of precisely known frequency to be obtained. The invention may provide in the above context the use of various modulus dividers in the generation of the reply sub-carrier frequency and in the timing of the period between replies, to reduce the interference which may be generated from tags in their non-reply period.

The invention may provide a modulation method and message structure in the reply which is simple to implement and to decode, which allows robust decoding, which allows prevention of unauthorised re-programming and which avoids to need to initialise code memory, and which assists in the determination of label position.

The invention may provide a modulation method, message structure and interrogator structure which promote the successful reading of label responses in the presence of interfering responses from other labels.

The invention may provide a multiplexer which allows in the generation of a reply the combination of program data with tag-field data. The invention may provide for the generation of tag-field data indicative of label position.

The invention may provide an interrogator structure which allows for excitation of labels and detection of replies from labels from a range of field creation and detection systems which combine to generate a highly pervasive interrogation field within the desired interrogation region, and a similarly highly pervasive reply field sensing effect, sometimes avoiding electronic interference, and achieving enhanced determination of label position.

Preferred embodiments of the invention will now be described with reference to the accompanying drawings wherein:

FIG. 5 shows a power supply rectifier in one form of coded label;

FIG. 17 shows the modulation method and data encoding method used in one form of the reply signal;

Figure 1:
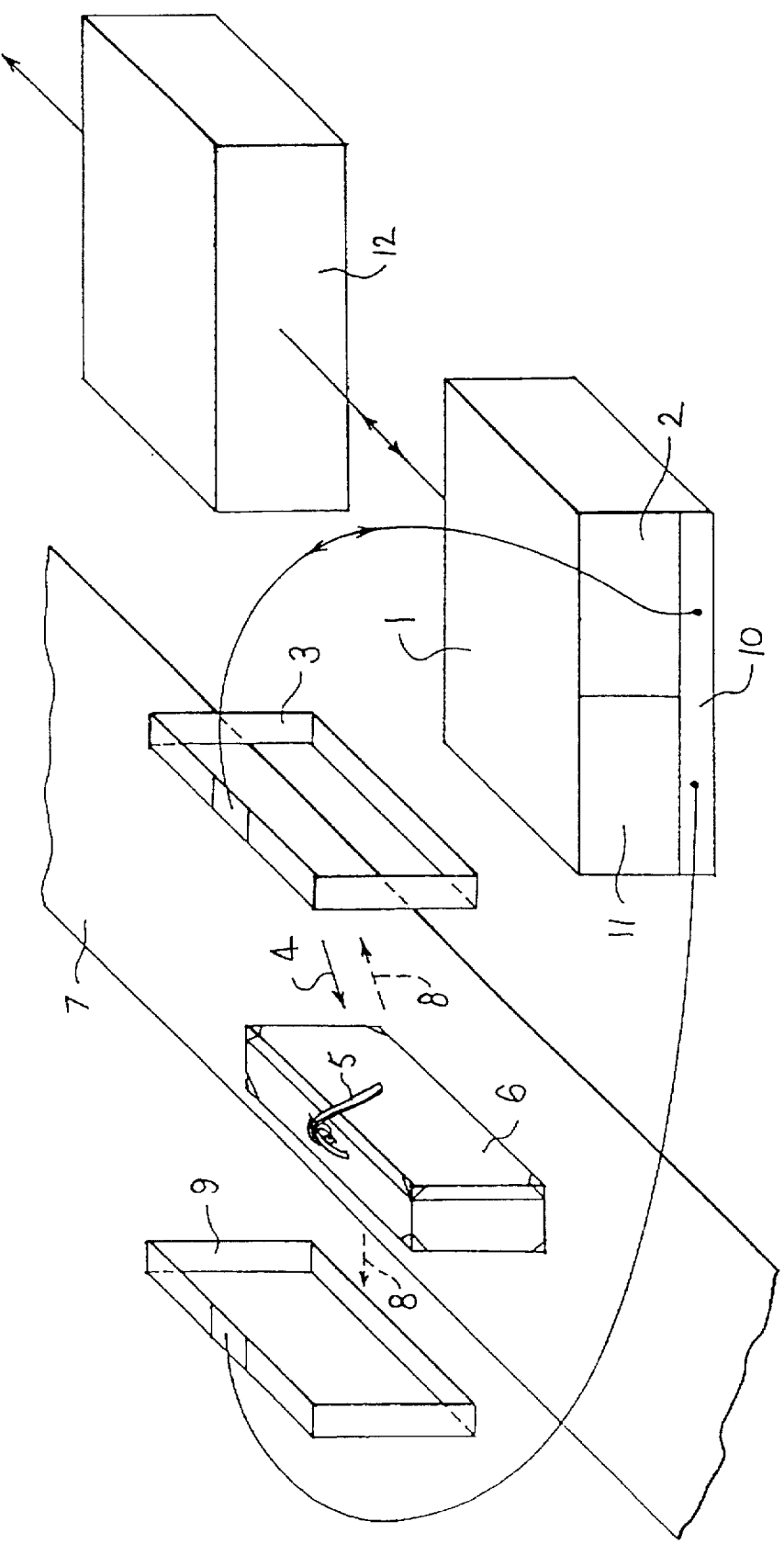
FIG. 1 shows the major components of an electronic label identification system in a baggage or cargo sorting application.

FIG. 1 shows an arrangement of components for a baggage or cargo handling operation in which an interrogator 1 containing a transmitter 2 generates an interrogation signal which is conveyed to an electromagnetic interrogation field creation system 3 which creates an interrogation electromagnetic field 4 in the region surrounding electronic label 5 attached to baggage or cargo item 6 moving on conveyor 7.

The label contains an electromagnetic coupling element which receives a proportion of the interrogation energy and and may contain a rectifier system which will supply power to an electronic microcircuit containing previously encoded information. The microcircuit contains a means for generating a reply signal.

In the presence of the interrogation signal the reply generating circuit becomes active and generates a reply signal containing the previously encoded information. The signal is conveyed either to the previously mentioned label coupling element or a separate label coupling element and generates in the vicinity of the label a reply electromagnetic field 8.

A portion of the energy present in the reply electromagnetic field is received either by the interrogator electromagnetic field creation system 3 or a separate reply field detection system 9 and may be conveyed, via signal separator 10 wherein it is separated from the interrogation signal, to receiver 11 within the interrogator. In the receiver the reply signal may be amplified, converted in frequency and decoded to reveal the information transmitted from the label.

The decoded information is conveyed to controlling computer 12 in which it may be used, possibly with the aid of information contained in a data base, to generate control signals which are conveyed to sorting gates which may regulate the subsequent movement of the baggage or cargo object.

Figure 2:
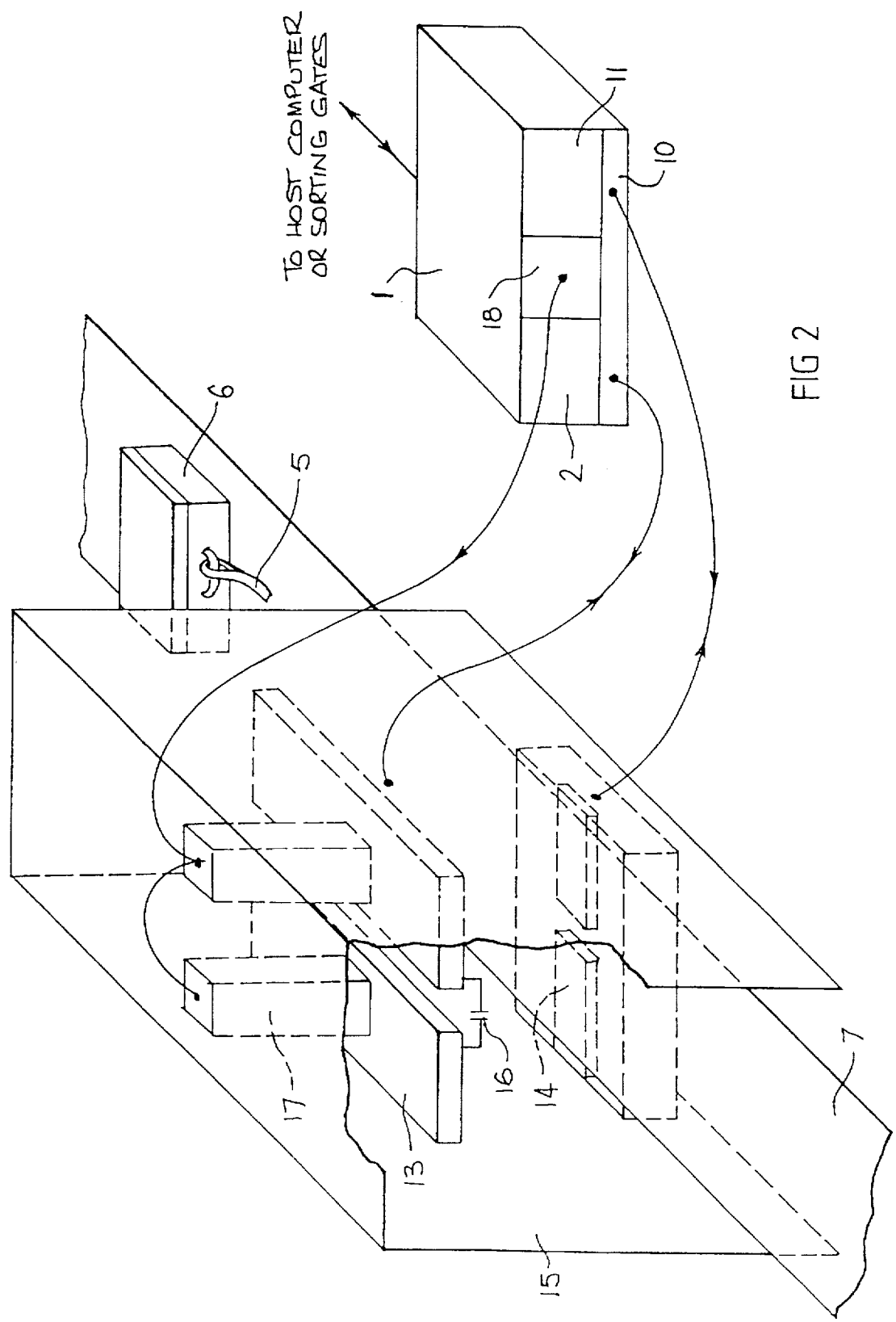
FIG. 2 shows a possible configuration of interrogation field creation and reply field sensing systems, a field confinement system and an auxiliary illumination system, in a baggage or cargo sorting application.

FIG. 2 shows one preferred embodiment of a combined interrogation field creation system and reply field detection system. In this embodiment the interrogation field creation structure contains a primary rigid creation in antenna 13 and may contain a secondary field creation antenna 14, both energised from the transmitter 2 through signal separator 10. Both primary and secondary field creation structures may be contained within a field confinement structure 15 which in this embodiment takes the form of a folded metal cover which may or may not be attached to the generally occurring metal plate under the conveyor 7, and may extend, in the direction of conveyor motion, beyond the region occupied by the field creation and detection structures by a distance comparable with the conveyor width.

The advantages of using the field confinement system shown are: that the interrogation field is confined more directly to the area being scanned and thus higher energy densities are obtained with limited interrogator power; that radiation of the interrogation signal to produce interference with other users of the electromagnetic spectrum is reduced; and the strengths of interfering signals from other users which reach the field detection structure and which can compete with weak label replies are substantially reduced.

In the preferred embodiment illustrated, the primary antenna structure 13 consists of two thick horizontal metal plates attached to the walls of the confinement structure and with a gap between them. This primary field creation structure is fed with a portion of the interrogation signal by a strip line which originates at the entry connector on the side wall of the field confinement structure 15 and passes under the right-most metal plate to reach the left-most metal plate.

The above field creation structure, which is substantially inductive, is tuned by a series of capacitors 16 placed across the gap, only one of these being shown. The advantages of the tuning and feeding arrangement described are that: the inductance of the structure is kept to a low value so that the parallel-tuned resonant impedance of the field creation structure does not become inconveniently high for excitation; the electric fields associated with the resonance process are confined to a region reasonably distant from most baggage and distant from backscatter noise generation mechanisms present in the conveyor and its support system; the feeding structure inherently provides between the gap and the feed connector a balanced to unbalanced transformer as well as providing the possibility of impedance transformation if the transmission line underneath the rightmost plate is suitably proportioned.

An additional advantage of the primary field creation structure and field confinement structure shown is that they together provide in the generally unoccupied space well above the conveyor an appropriate return path for the magnetic flux created by the structure without the necessity of an unwelcome intrusion of that flux into the regions beside the conveyor.

In the preferred embodiment shown in FIG. 2 there is also a secondary field creation structure 14 receiving a proportion of the interrogation energy. In the embodiment shown the secondary field creation structure takes the form of flat transverse bars, again capacitively tuned at their centre gap, bridging the ends of a rectangular box, of which the four sides and bottom are of metal, and of which the top is a non-conducting material which replaces, in the region of the box, the conducting material which normally supports the conveyor.

The secondary field creation structure shown provides the benefit that whereas that proportion of the interrogation field which is produced by the primary field creation structure in the vicinity of the conveyor is constrained by the metal underlay to the conveyor to lie substantially parallel to the conveyor surface, the installation of the secondary field creation structure in a gap in the conducting surface which normally underlies the conveyor will create an appropriately strong vertical component of interrogation field which will couple strongly to labels which may lie flat against the conveyor and thus be substantially uncoupled from the field created by the primary structure.

In another preferred embodiment of the field creation and confinement structures, the electrical connections to the secondary field creation structure, and possibly also the conducting bars themselves and the tuning capacitors of that structure, may be omitted. In either case the replacement of the normally conducting conveyor support material by a non-conducting section with metal-walled cavity below, and the parasitic currents which will flow in the transverse bars if they are still present, will re-shape the interrogation field produced by the primary field creation structure so that it will develop, in the region above the non-conducting upper surface of the box, the required vertical field component which will couple to labels which are unfavourably oriented by lying flat against the conveyor.

In the preferred embodiment shown in FIG. 2 one or both of the the primary and secondary creation structures may serve also as a reply field detection structure. In this preferred embodiment the reply signals received from the primary and secondary structures by the signal separator 10 may be combined and passed together to the receiver 11 or may be passed thereto still as separate signals.

In the preferred embodiment shown in FIG. 2 there may also be an auxiliary illumination system 17 energised from auxiliary illumination system power supply 18 within the interrogator. The auxiliary illumination system may consist of well-collimated millimeter wave, infra-red, optical, or ultra-violet energy, and is designed to project such energy on to a limited region over the conveyor length. The advantage of using such an auxiliary illumination system is that it may be used, in conjunction with sensors placed on the labels and communicating with the label microcircuit, to give an indication within the label reply of when the label is within the auxiliary illumination field. The indication may take the form of only permitting a reply from a label when that label is within the auxiliary field, or the provision of information within the label reply that the auxiliary field has been sensed. This indication allows the more precise determination of the position of each of several labels simultaneously present within the interrogation field.

Figure 3:
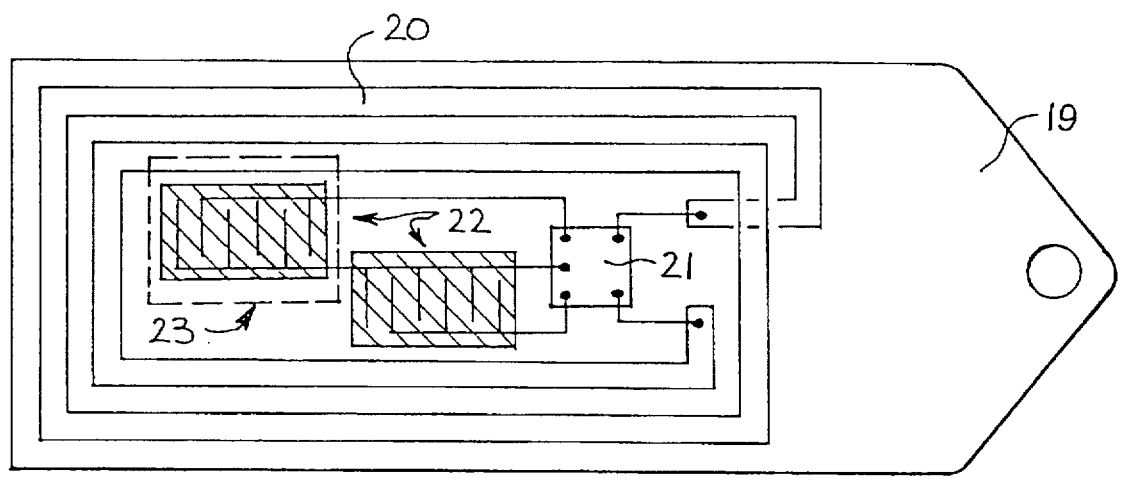
FIG. 3 shows the major components of a low-cost position-sensitive electronically interrogatable coded label.

An illustration of the major components of a preferred embodiment of an electronically coded label is shown in FIG. 3. In this embodiment the label 5 consists of an inexpensive plastic or cardboard body 19 upon which is embossed a metal foil antenna 20 of a small number of turns. This magnetic field sensitive antenna is connected at its ends to reply generating microcircuit 21 which is responsible for receiving energy from the interrogation signal and generating a reply.

In this embodiment the reply generating microcircuit may be connected also to a pair of auxiliary illumination system sensors 22, each of which may consist of a pair of an inter-digital electrodes overlaid with an infrared sensitive conducting film. The two sensors may be connected in a balanced configuration with a common terminal and two other terminals to the microcircuit. One of the sensors may be covered with an opaque material 23 while the label as a whole may be encased in a material, perhaps paper or cardboard, which allows some transmission of the auxiliary illumination signal to the other sensor.

The output of the sensors may be detected by circuits within the label to provide that the label reply is only issued when the label is within the auxiliary illumination field, or that a label reply which is not so restricted is nevertheless modified when the label falls within the auxiliary illumination field.

Advantages of the label structure are: that a minimum number of connections is maintained between the microcircuit of the antenna, only two being necessary for the combined operations of reception of the interrogation signal, transmission of the reply, and reception of programming signals; and that the connections to the auxiliary illumination system are also kept to a conveniently small value. The advantage of the installation of the auxiliary illumination sensor is that it can provide signals to the reply generating microcircuit which may be used to include within the reply an indication of when the label has passed through the auxiliary illumination field.

A further advantage of the structure described is that all components except the microcircuit have the mechanical flexibility which is desirable in practical applications, while the size of the microcircuit, although it may be not flexible, is sufficiently small for its inflexibility to be of little consequence.

Figure 4:
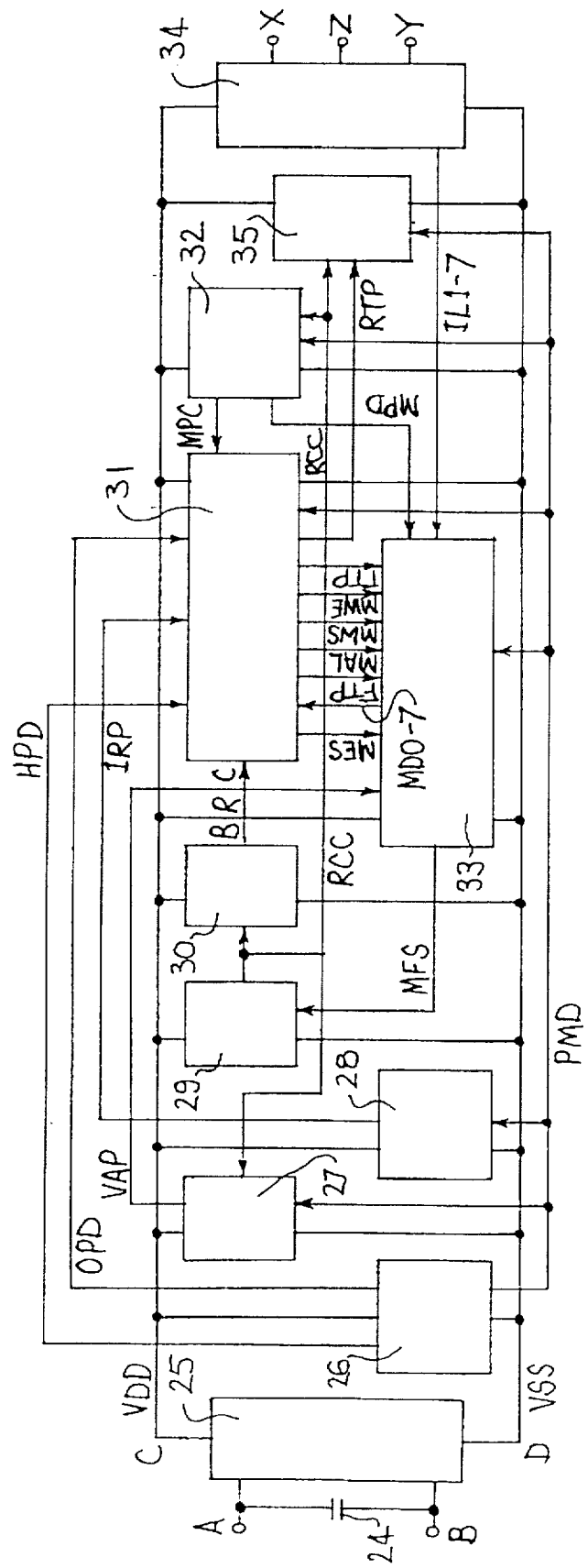
FIG. 4 shows a block diagram of the electronic circuit of one form of coded label.

A block diagram of a preferred embodiment of a label microcircuit is shown in FIG. 4. In this embodiment terminals marked A and B are intended to be connected to the label coupling element, while terminals marked as X, Y and Z may be connected to the auxiliary illumination sensor. The internal VDD and VSS power supply connections are labelled as such and to retain conformity with other drawings are also labelled as nodes C and D.

In this preferred embodiment the inductance of the label coupling element may be resonated by integrated parallel tuning capacitor 24. The advantages of the provision of a parallel resonating capacitor are that the received ac voltage at the interrogation frequency is enhanced, and that the resonant circuit provides a conveniently high impedance from which to energise subsequent circuits. An advantage of providing this resonating capacitor in integrated form is that its manufacturing and fitting costs are thereby very much reduced.

Operating power for the circuits may be generated in power supply rectifier block 25 which may supply the positive power supply line marked as VDD and the negative power supply line marked as VSS in the diagram.

In the preferred embodiment discussed, the power supply voltage between those two electrodes may serve as an input to mode control block 26 which has the task of determining in which of several operating modes the reply generation circuit is placed from time to time. The two outputs from the mode control block 26 are the Operating Power Detect signal OPD and Programming Mode Detect signal PMD. There may also be a High Power Detect signal HPD.

The three modes of operation of a reply generation microcircuit are: Quiescent Mode in which the circuit is placed when the output of the rectifier system is either zero or less than is useful for the generation of reply; Reply Mode in which the circuit is placed upon the raising the OPD line when a sufficient power has been first detected by the mode control block; and Programming Mode into which the circuit is placed when it has been for some time in reply mode and the interrogation power is briefly and abruptly extinguished and then abruptly restored after a suitable but short delay. Each of these three conditions is recognised by the mode control block 26 which generates appropriate output signals as defined in the preceding paragraph.

When the reply generating microcircuit is placed in programming mode the programming power supply block 27 becomes active to produce programming voltage VPP which is used in memory programming operations, but in reply mode the programming power supply block may be inactive and VPP not produced.

In this embodiment of the reply generation circuit, reply signals may be generated intermittently, with replies being separated in time by periods, equal to several times the time interval time taken for a reply, in which there is no reply activity. Each reply signal may consist of one complete message with appropriate preceding and trailing activity.

The times at which in reply mode reply signals are initiated may be determined by the positive transitions of the Initiate Reply Pulse signal IRP generated by the reply rate oscillator module 28. In a typical application this signal would be approximately square shaped and of total period 5 milliseconds.

In this embodiment a sub-carrier frequency for the generation of a reply signal may be provided within the label reply generation circuit by the reply sub-carrier oscillator block 29. In this embodiment the reply sub-carrier oscillator can be switched between two output frequencies of approximately 400 and approximately 320 kHz by means of the digital Modulation Frequency Select control signal MFS generated by circuits to be discussed latter. The output Reply Carrier Clock signal RCC may be reticulated from this module to bit rate generator module 30 and to other circuits also to be discussed later.

In this embodiment the bit rate module 30 may divide the reply carrier clock by a factor of four and may present the output as the Bit Rate Clock signal BRC to the state control machine 31. The state control machine 31 may control, in reply mode, the sequence of operations which assemble a reply signal from data sources from within the label, and in programming mode may generate appropriate control signals to accomplish the memory programming operations. A preferred embodiment of the state control machine will be discussed below.

Inputs to the state control machine may include the previously discussed Operating Power Detect signal OPD and Initiate Reply Period signal IRP, the Programming Mode Detect signal PMD, the Bit Rate Clock signal BRC, and a Memory Programming Clock signal MPC derived by the data and clock recovery module 32. This module, the detail of which will be discussed later, has, when the label microcircuit is in programming mode and the modulation of the VDD supply line caused by the reply generation process has been suppressed, the task of detecting amplitude variations in the power supply, and from those amplitude variations generating the aforesaid Memory Programming Clock signal MPC and a Memory Programming Data signal MPD, which together define the values of and the rate of arrival of the data which is intended to be programmed into the reply memory.

As well as providing the control signals for both reply generation and memory programming operations, the state control machine may also perform the function of determining when an appropriate programming key has been detected and may not allow programming to commence until the appropriate key is detected. The detailed operations of this module are discussed later.

In the reply generation process, data for producing a reply may be generated from a number of sources by the memory and multiplexer module 33. The detailed operation of this block will be discussed later, but we note that in the embodiment discussed here its output Multiplexer Frequency Select signal MFS, which changes at the rate established by the Bit Rate clock signal BRC, may be derived either from information in non-volatile memory contained within the memory and multiplexer block 33, or from the auxiliary illumination detector block 34, via the multi-line Auxiliary Illumination Level signal AL1-7.

The auxiliary illumination detector block 34 may receive passive signals from the label sensor discussed previously via connections X, Y and Z shown at the right of FIG. 4, and serves to generate an output which may either suppress replies unless the label is within the auxiliary field or may modify the label reply to contain information related to the strength of the auxiliary illumination field at the label position. A preferred embodiment of the auxiliary illumination detector will be discussed later.

In the preferred embodiment being discussed here the reply, signal may as a result of interaction between the switch load module block 35 and the power supply rectifier block 25 be generated as a frequency-modulated sub-carrier signal in the form of sidebands surrounding the interrogation signal frequency. Provided the Reply Transmission Period signal RTP coming from the state control module is asserted, the switch load module block 35 presents to the rectifier system 25 a load impedance which varies, in response to the Reply Carrier Clock signal RCC coming from the sub-carrier oscillator, at the sub-carrier oscillator frequency. In the preferred embodiment being discussed here, the switched load module 35 may perform further functions to be discussed later.

The schematic circuit diagram of a preferred embodiment of the power supply rectifier block of the label microcircuit is shown in FIG. 5a. In the figure, the input nodes connected to the parallel combination of the label coupling element 20 and tuning capacitor 24 are labelled in conformity with FIG. 4 as A and B, and output nodes connected to the VDD and VSS lines of the circuit are labelled also in conformity with FIG. 4 as C and D. In the circuit of FIG. 5a, the output voltage between nodes C and D is developed as the sum of the voltages developed across reservoir capacitors 36 and 37 through half wave rectifying diodes 38 and 39. The realisation of rectifying diodes 38 and 39 may be in terms of an n-type substrate, p-type wells, p-type and n-type implant layers is as shown in FIGS. 5b and 5c.

An advantage of the schematic circuit shown in FIG. 5a is that, in contrast with other rectifier circuits which have an output voltage of only half the peak inverse voltage across the diodes, the supply voltage developed is twice the peak inverse voltage across either of the diodes. Such a result has the advantage that the power range over which the label can be correctly and safely operated is increased.

The realisation shown in FIGS. 5b and 5c has the advantage that, of the layers normally available in a semiconductor manufacturing process, those which are used for the diode construction are those with the lowest practical doping density and resulting highest breakdown voltage. The advantage of this realisation is again to obtain the highest practicable label circuit dynamic range which is consistent with the manufacturing process.

In a preferred embodiment, the realisation of the reservoir capacitors 36 and 37 may be as shown in FIG. 5d. Capacitor 36 between nodes C and D may be realised between an implant layer in a n-type substrate and a polysilicon layer normally used for the gates of transistors, with an oxide thickness normally used for the gate insulation of transistors as insulation. This realisation has the advantage of providing a high capacitance per unit area of the substrate. Capacitor 37 may be realised between the polysilicon layer forming the upper electrode of capacitor 36 and a further second level polysilicon layer forming the other electrode, with a layer of vapour deposited oxide forming the insulation. An advantage of the overall realisation of capacitors 36 and 37 within the same plane area of the circuit is that the overall circuit area and hence manufacturing cost is minimised.

The realisation of diode 38 may be as shown in FIG. 5b for a p-well process. The anode section of the diode is formed by the lightly doped n-substrate 39 with more strongly doped n-type contact region 42. The anode is formed by lightly doped p-well 40 with more strongly doped p-region 41 providing the anode connection. The realisation of diode 39 may be as shown in FIG. 5c for a p-well process. Here the anode is formed by lightly doped p-region 43 with anode connection provided by more strongly doped p-region 44. The cathode is provided by n-type implant region 45.

The advantage in both of the above realisations is that each diode is formed between the most lightly doped of the available layers of the manufacturing process with the result that the breakdown voltages are the highest which may be practically provided.

Figure 6:
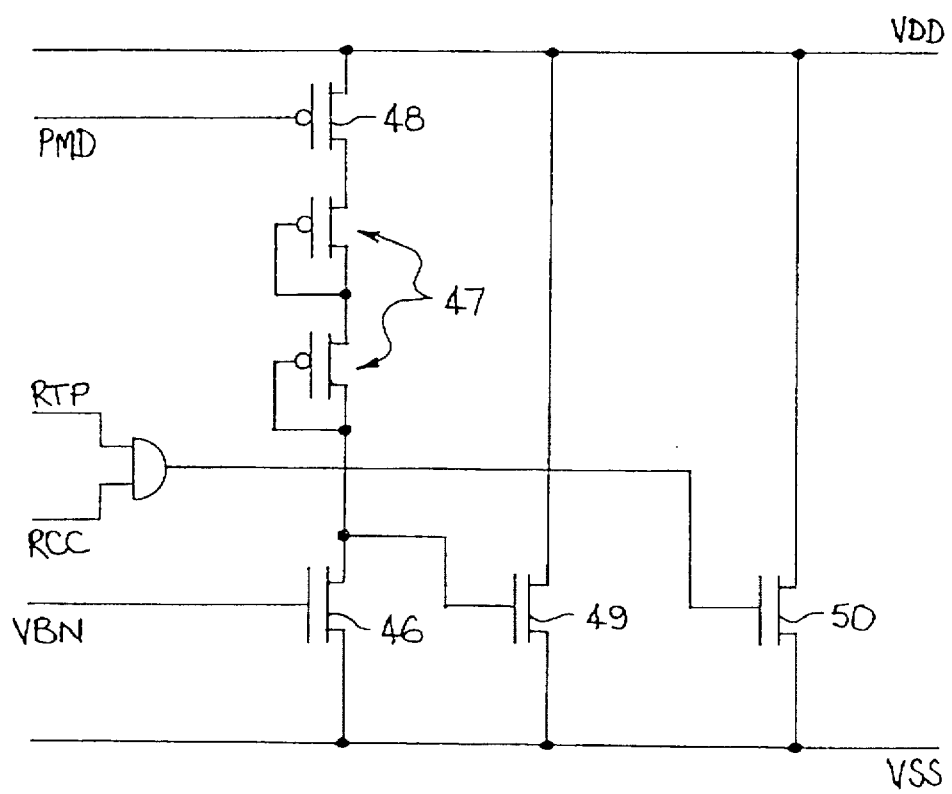
FIG. 6 shows a switched load module used in one form of coded label.

The schematic circuit of a preferred embodiment of the switched load module 35 is provided in FIG. 6. In this circuit an approximately constant current generated by transistor 46 operating under externally derived bias signal VBN for n-type current sources provides a constant current load for voltage dropping transistors 47 which maintain a bias to static load transistor 49 approximately two threshold voltages below the VDD supply. Load transistor 49 may be designed with large width to length ratio so that a rapidly increasing load is applied when voltages exceed about 4 times a typical threshold voltage.

In the switched load module, the load provided by transistor 49 is disabled in programming mode through the operation of transistor 48 operating under control of the Programming Mode Detected signal PMD. The advantage of this disablement is that in programming mode an appropriate value of the VDD supply may be developed without the application of unduly large interrogator power.

The time-switched load of the circuit is provided by transistor 50, which may also be of large width to length ratio, also operates, during the period in which a reply is transmitted and thus RTP is high, under control of the Reply Carrier Clock signal RCC. The periodically varying load provided by transistor 50 generates through its action on the rectifier system a reply signal which is radiated by the label coupling element 20.

The advantages of providing a switched load module 35 in this form is firstly that the static load characteristic provided by transistor 49 may allow the application of large interrogator power without development of an excessive supply voltage, and also increases the load presented to the tuned circuit formed by the coupling element 20 and the resonating capacitor 24, so that the reduction and quality factor of this circuit reduces the ratio of its output voltage to the voltage induced in the coupling element. Both of these effects operate to increase the range of interrogator powers over which the circuit will operate correctly and without damage. A further advantage of the structure is that suitable matching in the characteristics of transistors 49 and 50 may be made to ensure that the reply signal is produced with good modulation depth over that enhanced dynamic range.

Figure 7:
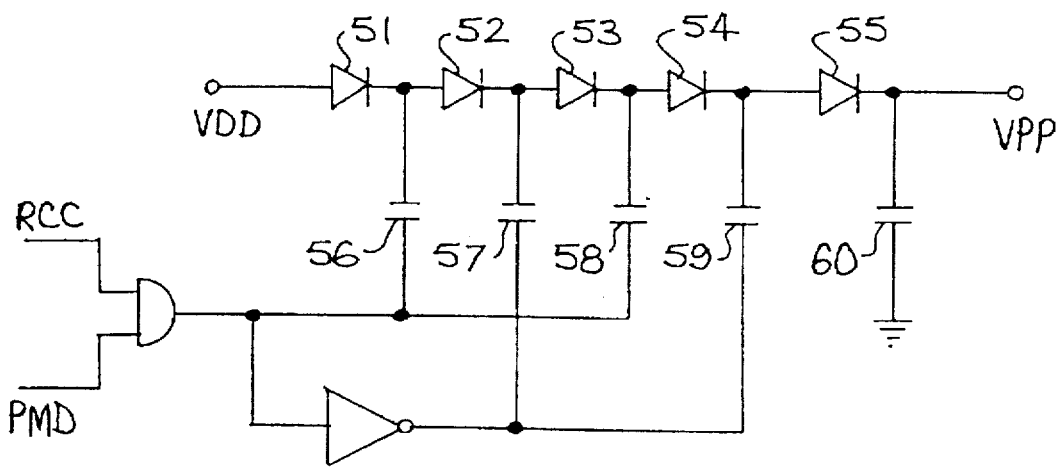
FIG. 7 shows the circuit of a programming power supply used in one form of coded label.

The schematic circuit of a preferred embodiment of a programming power supply is provided in FIG. 7. In this circuit diodes 51 to 55 inclusive which may be realised with anodes in the form of floating p-wells and cathodes in the form of implant regions within those wells, are for convenience driven from the Reply Carrier Clock signal RCC and its complement through capacitors 56 to 59 inclusive, to accomplish the transfer of charge from the VDD line through steadily increasing voltages to final reservoir capacitor 60 at which the programming voltage VPP is produced.

The advantage of this structure is that an output voltage significantly in excess of the original supply or clock amplitude may be produced, and that the most seriously stressed reverse-biassed p-n junction, which may be the parasitic junction between the p-well and the n-substrate which is not shown in the figure, may be realised between available process regions which have the lightest doping and hence the highest breakdown voltage.

Figure 8:
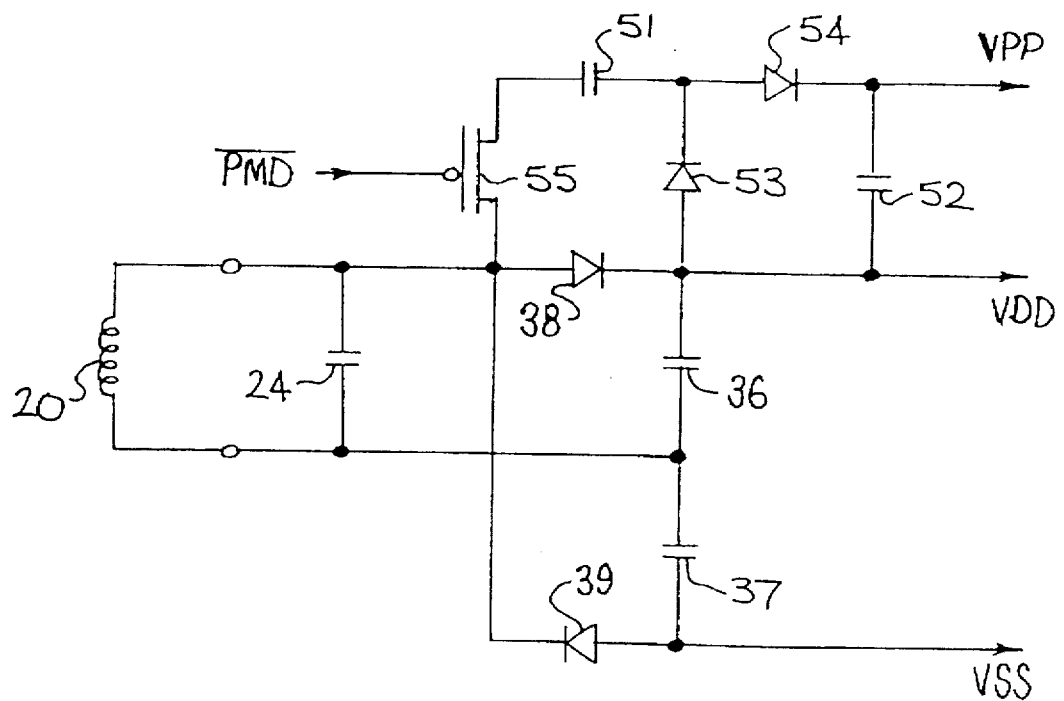
FIG. 8 shows the circuit of a programming power supply used in another form of coded label.

An alternative preferred embodiment of the programming power supply is illustrated in schematic form in FIG. 8. In this circuit a voltage doubler rectifier constructed from capacitors 51 and 52 and rectifying diodes 53 and 54 produces a programming voltage VPP which may be elevated above main supply voltage VDD by an amount approximately twice the peak value of the interrogator frequency ac voltage developed across the parallel resonant circuit formed by coupling element 20 and the resonating capacitor 24. The result may be a programming voltage relative to the negative supply line VSS of approximately twice the main VDD supply voltage, which value may be satisfactory for memory programming applications. As the schematic shows, the programming voltage is only developed when the Programming Mode Detected signal PMD is asserted.

The advantage of achieving the programming voltage by rectification at the interrogation frequency is that the coupling and reservoir couplers C3 and C4 may be of smaller size than if a lower excitation frequency were used. A further advantage lies in the comparatively small number of components required. An advantage of only developing the programming voltage VPP when PMD is asserted is that, as programming voltage will only be developed when the label is in the controlled environment designed for programming and control of the level of the interrogation field strength is possible, the excessive programming voltage which could be developed when the label experiences various operational interrogation field strengths is avoided.

Figure 9:
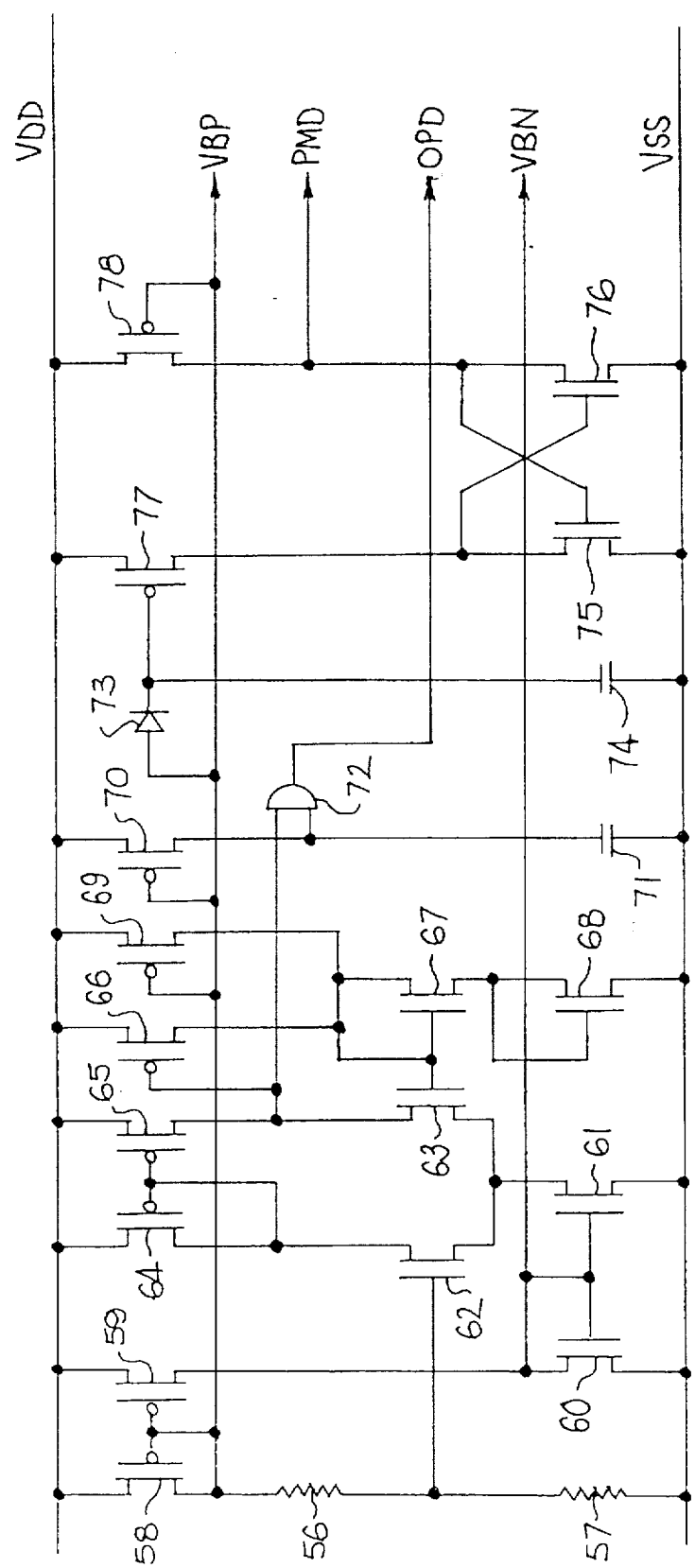
FIG. 9 shows shows the schematic circuit used in one form of proximity programmable coded label.

A schematic circuit of a preferred embodiment of the mode control block shown in FIG. 4 is provided in FIG. 9. This circuit takes as its input the voltage between the VDD and VSS supply lines and produces as its output bias voltages VPB and VBN which may be used generally throughout the circuit to produce constant current sources from either p-channel or n-channel transistors respectively, the Operating Power Detect signal OPD, and the Programming Mode Detect signal PMD.

In the circuit a power supply dependent current is first generated by resistors 56 and 57 and two-terminal transistor 58. Transistors 59, 60 and 61 generate a constant current for the differential amplifier employing gain transistors 62 and 63 and load transistors 64 and 65. Transistors 67, 68 and 69 provide a reference voltage for the gate of transistor 63 against which the voltage at the junction of resistors 56 and 57 is compared.

Transistor 66 provides an additional current, the existence of which depends on the output state at the common connection of transistors 63 and 65, through load transistors 67 and 68, to provide in the switching point of the differential amplifier just discussed the desirable hysteresis for non-oscillatory behaviour of this power detection circuit.

The output of differential amplifier is combined with a slowly-rising logic high signal developed at the junction of the drain of transistor 70 and capacitor 71. That signal is used in gate 72 to generate the Operating Power Detect output signal OPD, which may be asserted after the power supply has reached a satisfactory level with possibly with a time delay dependent upon the size of capacitor 71 if the power supply has risen quickly.

The Programming Mode Detect signal PMD is developed as one of the outputs of a bi-stable flip flop involving transistors 75, 76, 77 and 78. This flip flop may be constructed with unequal load transistors 77 and 78 to have a bias to-ward greater conduction in transistor 77 rather than transistor 78 so that when the power supply rises slowly, as it will do upon normal entry of tag in an interrogator field, and in consequence the delay in the gate signal to transistor 77 provided by capacitor 74 may not be significant, the output PMD remains in a low state.

When however the VDD supply is suddenly and briefly interrupted, the gate of transistor 77 will for a time remain high. If the power supply is shortly and abruptly restored the flip flop may be re-energised with a bias towards conduction in transistor 78 rather than transistor 77, so that the output Programming Mode Detect signal PMD signal will go high and remain high for the period of further application of the VDD supply.

A schematic circuit diagram and an illustration of the operation of a preferred version of a data and clock recovery module used in a proximity programming process in provided in FIG. 10. In the schematic circuit of FIG. 10a, input signals to the circuit come from moderate-depth two-level amplitude modulation of the interrogator signal and thus in the power supply voltage VDD and may be of the form shown in FIG. 10b. Such variations may be increased in amplitude in controlled-gain ac-coupled amplifier 79 and converted to single-bit digital form in analogue voltage comparator 80, the output of which is used to enable or disable programming clock counter 81 which advances, from its initial setting of terminal count of fifteen, under control of the Reply Carrier Clock signal RCC.

When the count of four is reached, the positive transition at the output Q3 of the most significant bit of the counter 81 latches into D-type flip flop 82 the current value of the output of comparator 80, thus providing an indication of whether the modulation of the power supply has been such as to maintain that output, at that instant, at a high value or whether it has returned to its lower value.

Following the testing, at the positive transition of Q3, of the state of the output of comparator 80, the counter 81 continues to advance until its terminal count of 15 is reached. By this time the modulation may be such that the output of comparator 80 is low, so that gates 82 and 83 will deny further clock pulses to counter 81.

Figure 10A:
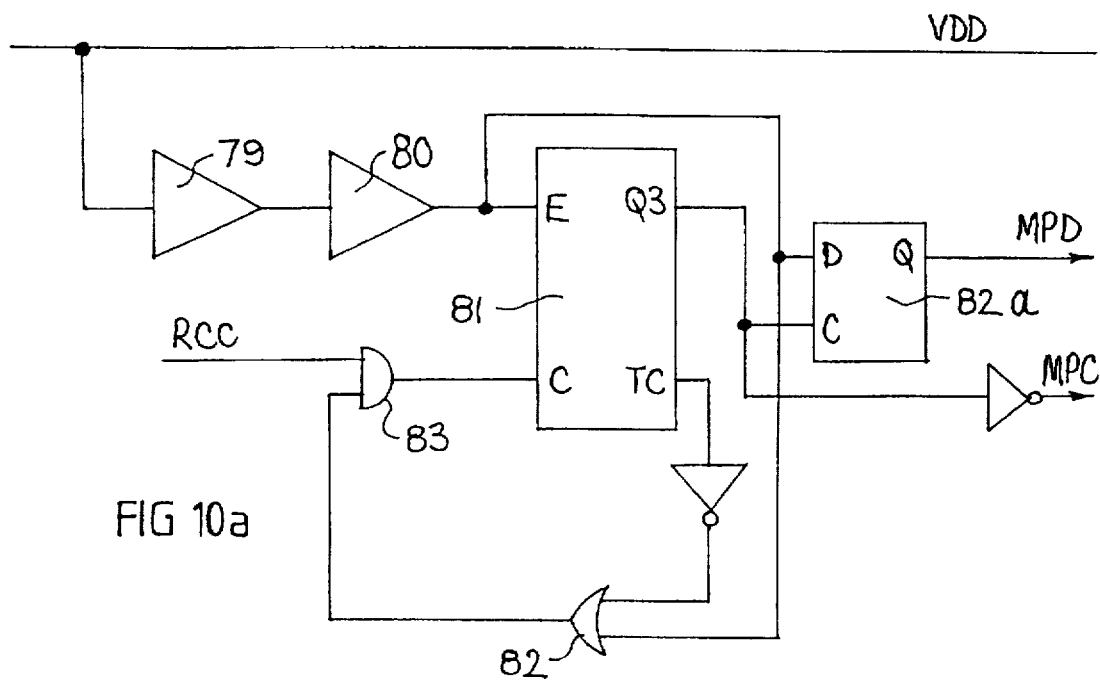
FIG. 10 shows a block diagram of the data and clock recovery system used in one form of proximity programmable coded label.
Figure 10B:
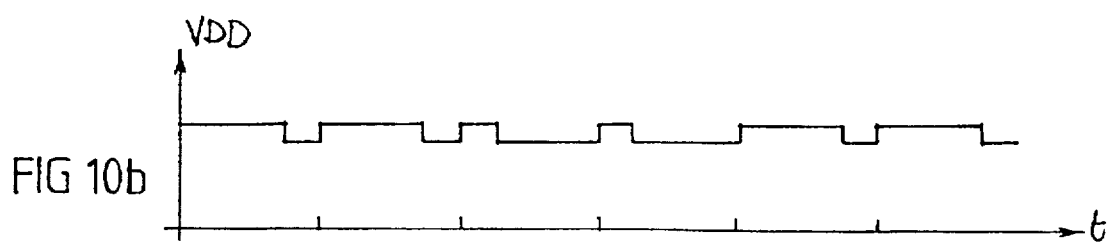
Figure 10C:
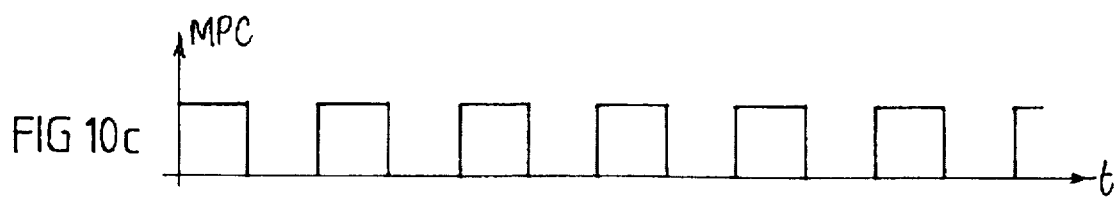
Figure 10D:
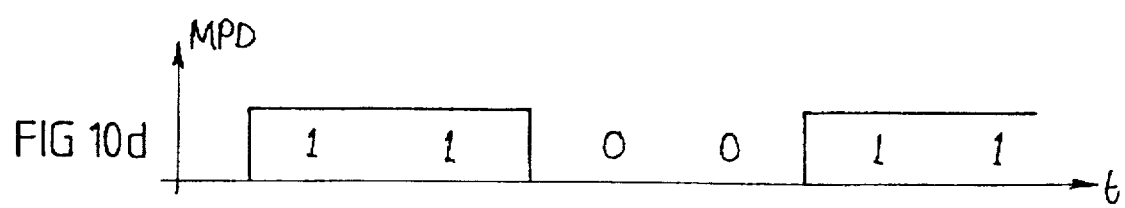

The output of the flip flop 82a is provided as the Memory Programming Data signal MPD whereas the output of the most significant bit Q3 is inverted and made available as the Memory Programming Clock signal MPC. The output MPC and MPD waveforms which result from the VDD modulation shown in FIG. 10b are illustrated in FIGS. 10c and 10d respectively. The supply voltage modulation illustrated can be denoted as small-amplitude asynchronous pulse-width coding.

The advantages of recovering memory programming data and clock signals in this way are: that the label memory may be programmed by non-contact means; that this programming may be performed without increasing the number of connections between the reply generation circuit and the label coupling element; that the necessary timing signals can be obtained without the use of logic circuits operating at the interrogation frequency itself; and that memory programming and clock signals with the appropriate timing relationships may be obtained.

In a preferred embodiment of this system programming may be arranged to always take place in an interrogation field of known strength and after reading a complete reply signal from an interrogation at that field strength, so that the value of the reply carrier clock frequency which will apply in programming operations can be predicted from that found in the just-performed reply cycle.

Figure 11:
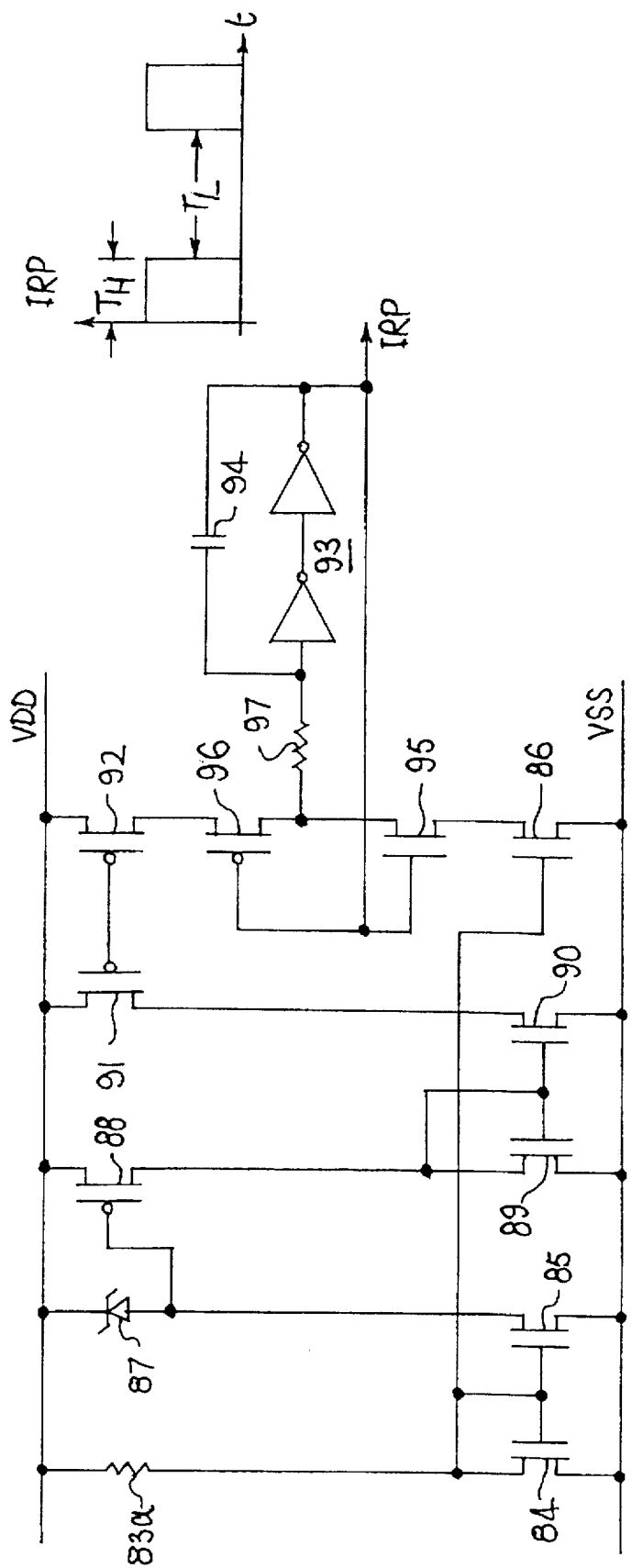
FIG. 11 shows the schematic circuit of a reply rate oscillator used in a coded label providing for the successful reading of multiple labels simultaneously present in the interrogation field.

A schematic circuit and output waveform and preferred embodiment of the reply rate oscillator 28 shown in FIG. 4 is provided in FIG. 11. In this circuit a power supply voltage dependent current is first developed through resistor 83a and two-terminal load transistor 84. Transistors 84 and 86 act as a current mirror to produce from the latter transistor a pull-down current for the oscillator circuit to be discussed shortly. Transistor 85 generates another mirror current to energise the Zener diode 87 to provide at its anode a reference voltage approximately a fixed level below the VDD supply. This reference voltage is used as a gate bias for transistor 88 which generates firstly through current mirror involving transistors 89 and 90 and a secondly through further current mirror involving transistors 91 and 92 a pull-up current for the oscillator circuit still to be discussed below.

The oscillator circuit consists of a cascade of inverting amplifiers 93 with positive ac feedback provided by timing capacitor 94 and negative dc feedback provided by gating transistors 95 and 96 which supply one or other of the pull-up or pull-down currents generated from transistors 86 and 92 by means outlined above. The high and low periods of the oscillator are therefore determined by the relationship of those currents, the timing capacitor 94 and the change in capacitor voltage which must occur after one switching before anther switching occurs. Resistor 97 has been included to limit transient currents from the power supply which occur during the switching transitions when the positive feedback provided by capacitor 94 drives parasitic diodes within transistors 95 and 96 beyond the limits established by VDD and VSS power supplies.

Because the pull-down current provided by transistor 86 is in this circuit approximately proportional to the power supply voltage, whereas the method of generation of pull-down current provided by pull-down transistor 92 may be such as to make it substantially independent of power supply voltage once a satisfactory operating voltage has been reached, and because the necessary transition in the input voltage to amplifier 93 for switching of the oscillator to occur is proportional to the power supply voltage, the circuit has the property that the duration of its high output period is approximately constant, whereas the duration of its low output period is dependent upon power supply voltage and increases with increase in the power supply.

The advantage of using this circuit is that replies from different labels in different interrogation field strengths will be offered with differing inter-reply time intervals, and any accidental overlapping of replies will not normally be repeated in the subsequent occurrences of the same replies. The circuit has the further advantage that replies from labels with good coupling to the interrogation field, and which can therefore be read with great clarity, will be offered less frequently, so that the less easily readable replies from less favourably positioned tags will have more opportunities to be read.

In another preferred embodiment of the above circuit components 83 and 84 may be omitted and the bias voltage upon which the rest of the circuit depends may be developed by alternative means such as the use of the n-channel bias signal VBN developed at the drain of transistor 60 in the mode control circuit shown in FIG. 9.

Figure 12:
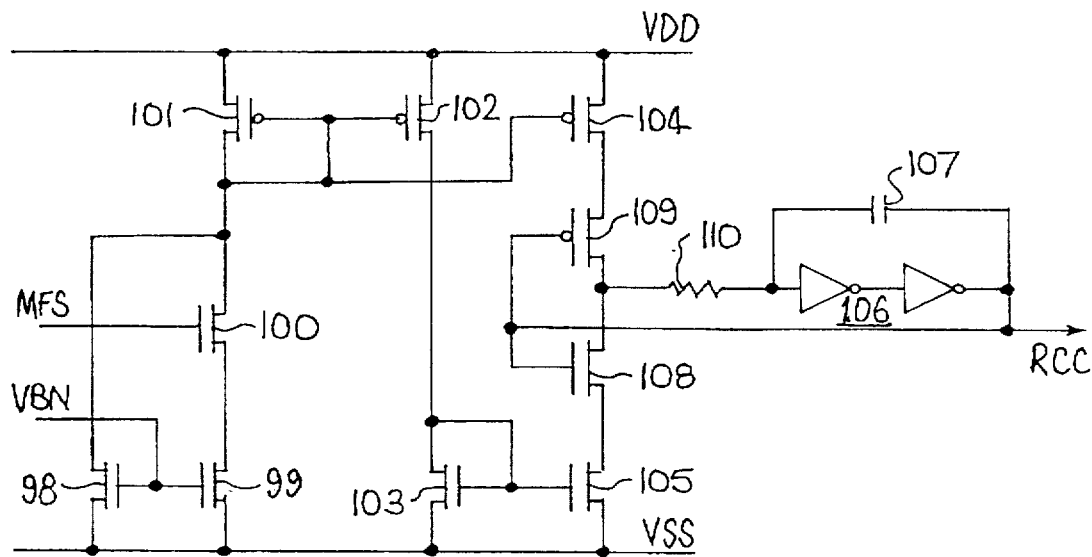
FIG. 12 shows the schematic circuit of a reply sub-carrier oscillator used in one form of coded label.

A schematic circuit of a preferred embodiment of the sub-carrier oscillator 29 shown in FIG. 4 is provided in FIG. 12. In this circuit a bias voltage VBN which may be derived from the mode control block 26 drives current generators 98 and 99, of which the latter is switched by transistor 100 driven by the Modulation Frequency Select signal MFS. The combined current is passed to current mirrors formed by transistors 101 and 102 following which a current mirror formed by transistors 101 and 104, and a further current mirror provided by transistors 103 and 105 provide similarly sized pull-up and pull-down currents at the drains of transistors 104 and 105 for the benefit of the oscillator circuit which they serve.

Components not so far mentioned, viz inverters 106, positive feedback capacitor 107, gating transistors 108 and 109 and resistor 110 have the same function as was described for similar components in relation to FIG. 11. In this circuit, however, there is the difference that both the pull-up and pull-down currents are firstly dependent upon the state of the Modulation Frequency Select signal MFS and secondly are approximately proportional to the power supply voltage, as is the voltage through which feedback capacitor 107 must be charged and discharged between switching instants, with the result that output frequencies of the oscillator are approximately independent of power supply voltage, once a satisfactory operating voltage has been obtained.

The advantage of using an oscillator of this form, in which the feedback capacitor is charged and discharged by switched constant current sources, is that a small feedback capacitor, with resulting economy in circuit area, can be employed. There is also the advantage that the the necessity of simultaneously providing extremely high value resistors which are difficult to realize with close tolerances in integrated circuit processing, and are difficult to realize at high values without consuming large amount of circuit area, is avoided. The method of provision of reply sub-carrier frequencies illustrated also has the advantage that the ratio of the two values of reply sub-carrier frequency is dependent on the relative proportions of transistors 98 and 99 and can be well controlled.

Figure 13:
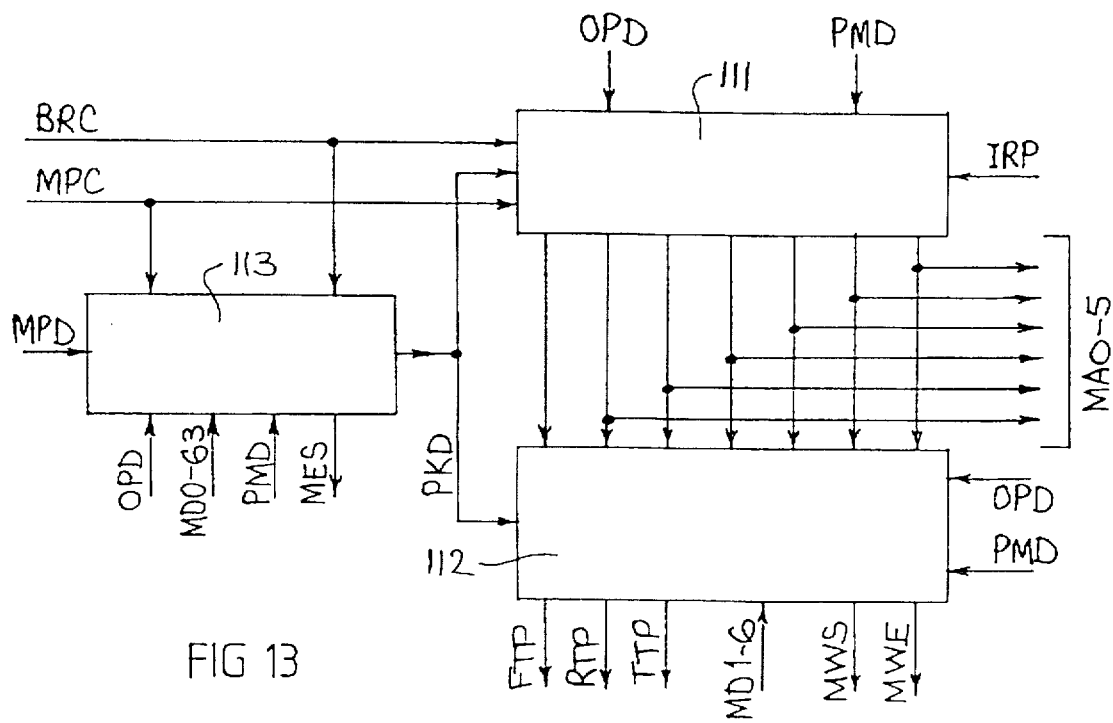
FIG. 13 shows a block diagram of a state control machine used in one form of programmable coded label.

A block diagram of one preferred embodiment of the state control machine 31 shown in FIG. 4 is provided in FIG. 13. The central component of this block is the seven-bit binary counter 111 which may be clocked, when the Operating Power Detect signal is asserted, by either the Bit Rate Clock signal BRC from the bit rate clock generator 30 or the Memory Programing Clock signal MPC from the data and clock module 32, the choice depending upon the level of Programming Mode Detect signal PMD. The counter may begin advancing only on the rising edge of the Initiate Reply Period signal IRP obtained from the reply rate oscillator 28 discussed previously.

The outputs of the seven-bit counter provide memory address lines MA0–6 the six least significant of which are reticulated to the sixty-four bit memory contained in the memory and multiplexer module 33 and all of which are reticulated to the state control decoder 112. This latter circuit may take as it inputs the Operating Power Detect signal OPD and the Programming Mode Detect signal PMD, and an additional Programming Key Detect signal PKD to be discussed shortly, to produce outputs which regulate both the process of generation of a reply and outputs which regulate the programming of the memory when in programming mode. The memory may be configured as an array 8 rows and 8 columns and produces eight columnar output bits simultaneously for each row address. The state control decoder may also take as some of its inputs six of the bits which are produced by the memory when its three bit row address is in the zero state.

In this embodiment the six memory data bits so received may be used to inhibit memory programming if they are found, at the time the programming mode detect signal rises, to all be set high. The advantage of this feature is that memory may be optionally programmed, by setting all of these bits high, so that it cannot be re-programmed, and the benefits of a one-time programmable memory are obtained. A further advantage is that the memory may be manufactured and the circuit applied to labels without the memory having to be set, by use of additional contacts or probing operations, in a particular initial state. This feature rests upon the fact that while a memory when freshly manufactured cannot be guaranteed to have any of its its cells set either to a binary zero or binary one state, there is a natural bias to a state of one kind or another, and the probability that all will be of one kind and in a direction against that natural bias is very low. Thus only a negligibly small proportion of reply generation circuits will be found to be in an unprogrammable state, and it is economically advantageous as a result to eliminate from the label manufacturing process either or both of the circuit testing or the processes of placing the memory in an initial state.

In reply mode, the output signals from the state control decoder 112 consist of the Flag Transmit Period signal FTP, the Reply Transmit Period signal RTD, and the Tag-field Transmit Period signal TTP. These signals may be reticulated to the Memory and Multiplexer module 33 shown in FIG. 4, wherein they may accomplish the operations described immediately below. In these operations the Flag Transmit Period signal FTP is raised for the first sixteen cycles of the seven-bit counter, and causes the transmission of flag signals consisting of sixteen bit-periods all at the same frequency. The reply transmit period signal is then raised for sixty-four cycles of the seven-bit counter, and causes transmission of the contents of the sixty-four bit reply memory. Next the tag transmit period signal is raised for eight cycles of the seven-bit counter and causes the transmission of eight tag-field bits. In the preferred embodiment described in FIG. 4 these bits may contain information on the strength of the Auxiliary Illumination Signal detected by the sensor system 22 and 23 on the label and shown in FIG. 3.

During programming mode the state control decoder may generate a Memory Write Enable signal MWE and Memory Write Strobe signal MWS which are used by the memory and multiplexer circuit in the writing into the memory of memory data provided by the data and clock recovery block 32.

In programming mode, however, such signals will only be generated by the state control decoder 112 if a Programming Key Detected signal PKD has been issued by the key detect module 113. In its simplest form this module may contain a shift register into which bits detected by the data and clock recovery module 32 are serially fed. When a sufficient number, possibly sixteen, of these bits of the same sign have entered the register, combinatorial logic which examines the contents of the register may generate a latched Programming Key Detect signal PKD which then remains high for as long as the Programming Mode Detect signal PMD remains high. Provided programming has not been inhibited as a result of setting of the programming inhibit bits in the memory as described above, the key detect module 113 may also generate for the three programming clock cycles following the detection of a key a Memory Erase Signal MES which is output to memory in the memory and multiplexer module 33 wherein it accomplishes erasure of the memory contents.

In another preferred embodiment, providing for greater security in programming operations, of the state control machine the key detect module 113 may also make use of memory data bits 0–63, which may be absorbed into the key detect module during the issuing of the reply which precedes the issuing of programming mode detect signal, to generate a programming key which firstly depends upon that memory data, and secondly depends upon the memory data in a way that cannot be predicted by examining the reply. In this preferred embodiment, the latter feature may be achieved by modifying the state control decoder 112 so that the duration of the period for which the Flag Transmission Period signal FTP remains high is extended by eight bits so that the first eight bits stored in memory do not appear in the reply message, although they may be known to the agency which first, in secure conditions, programmed the label.

In this way it may be brought about that the label, although continuously re-programmable, cannot be successfully re-programmed unless the correct key, which can easily be made longer than the previously mentioned example of sixteen bits, is known. In this embodiment it will be seen later in discussion relating to FIG. 17 of the allocation of bits to memory that the first eight bits, which control re-programming operations in the way just discussed, are distinct from the information carrying data bits, which are used to regulate the flow of the baggage item after the label is read.

Figure 14:
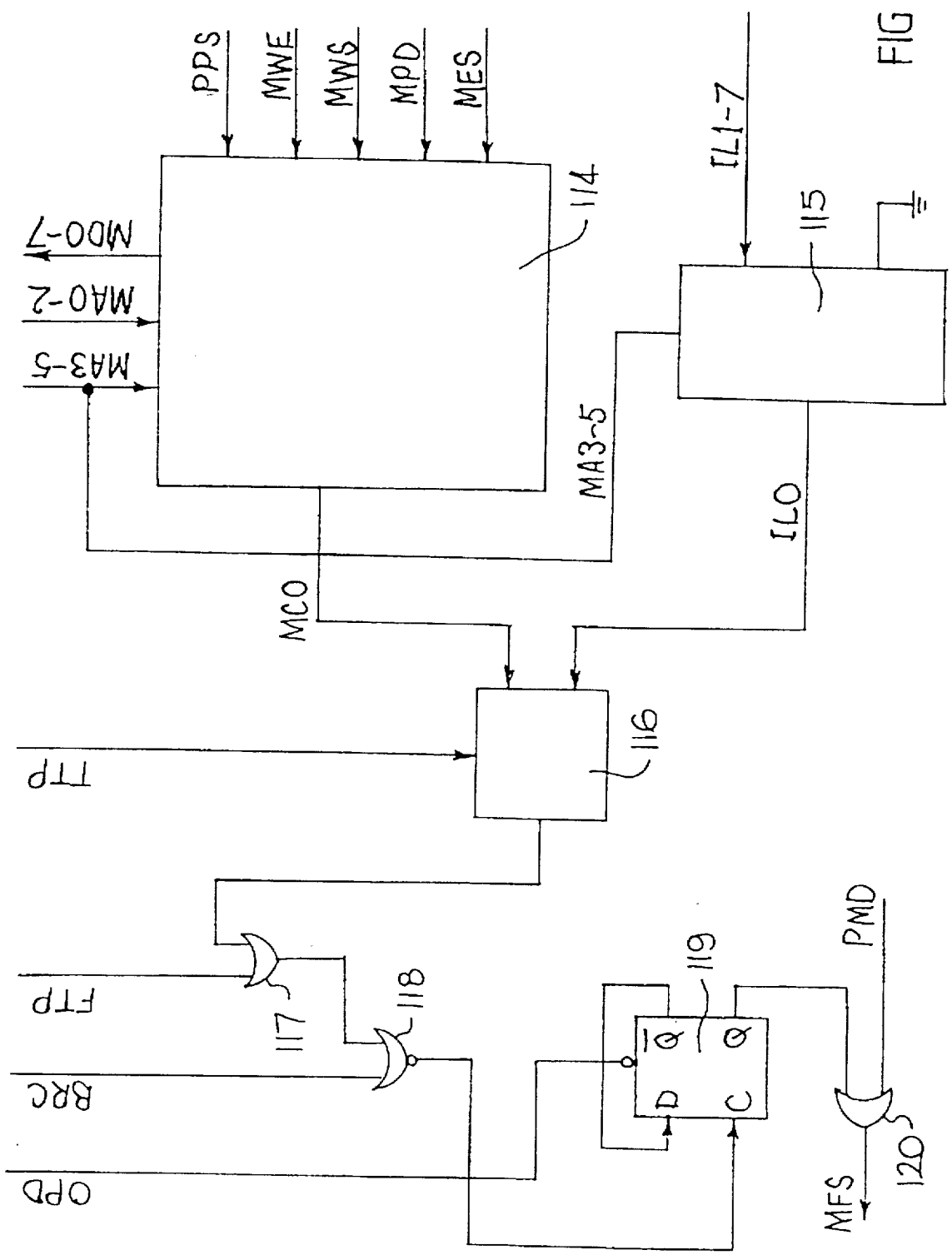
FIG. 14 shows a block diagram of a memory and multiplexer circuit used in an identity and position indicating coded label.

A block diagram of a preferred embodiment of the memory and multiplexer block 33 shown in FIG. 4 is provided in FIG. 14. The central element of this block is an electrically programmable and erasable memory array. This memory array may arranged in the form of eight rows by eight columns, and may be addressed by row address signals MA0–2 and column address signals MA3–5. The memory may produce a single bit Memory Cell Output signal MCO output determined by the entire memory address address and in addition, may produce an eight-bit Memory Data Output signals MD0–7 addressed by the three row address lines.

The memory and multiplexer block may also contain an eight-line to single-line data selector 115, also addressed by memory address signals MA3–5, so that the eight signals provided by Illumination Level detection signals IL1–7, and an eighth permanently low digital signal in the ground input to block 115, may be individually selected to produce a single-bit output labelled as the Illumination Level Output signal ILO in the figure. Selection between the Memory Cell Output signal MCO or the Illumination Level Output signal ILO may be accomplished in two-line to single-line data selector 116, operating under control of the Tag-field Transmission Period signal (TTP) generated as discussed previously by the data control decoder 112 in the state control machine 31.

The output of the data control selector may be combined in gates 117 and 118, flip flop 119 and OR gate 120 so that in reply mode differential frequency shifting of the reply carrier clock occurs, with a constant frequency being maintained during the flag transmission period and a potentially variable frequency resulting when memory data or illumination level data is being transmitted. During programming mode the OR gate 120 may assure that the reply carrier oscillator operates continuously at its higher frequency.

Figure 15:
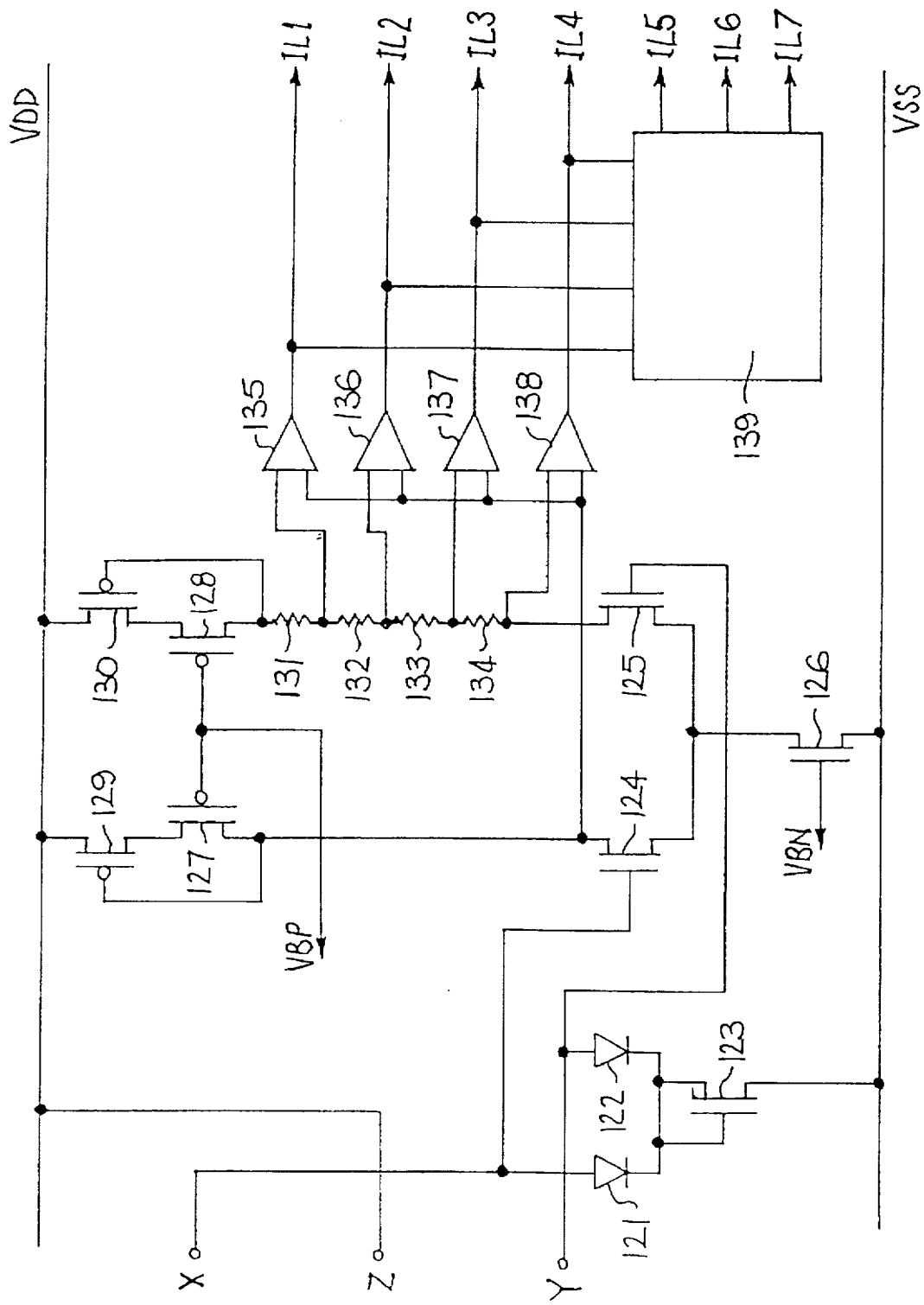
FIG. 15 shows the schematic circuit of a detection system for auxiliary label illumination.

A block diagram of a preferred embodiment of an auxiliary illumination detector shown as 34 in FIG. 4 is provided in FIG. 15. The circuit takes as its input currents produced by sensor elements 22 of FIG. 3 connected between nodes X and Y and Z shown in FIGS. 4 and 15.

The input currents flowing to terminals X and Y are converted to a logarithmic scale in diodes 121 and 122, the voltages across which are added to a common node voltage developed across transistor 123, and applied to the gates of differential amplifier transistors 124 and 125 supplied by constant current source provided by transistor 126, operating under control of the bias voltage VBN which may be developed by the mode control block 26.

A load circuit for the differential amplifier is provided by approximately constant-current transistors 127 and 128 with gate voltages supplied by the p-channel bias signal VBP generated as shown in FIG. 9 within the mode control block 26. To better control the amplifier gain the loads may be given non-zero incremental output conductantes through the operation of degeneration transistors 129 and 130. The differential output signal produced at the drains of transistors 127 and 128 is combined with progressively increasing offset voltages provided by polysilicon resistors 131, 132, 133 and 134 and sensed by voltage comparators 135, 136, 137 and 138 to produce non-binary auxiliary illumination level signals IL1–4 which may furnish an expression of the illumination level differentially detected by sensors 22 in FIG. 3. As this expression is transmitted by tag-field bits for which the robust cyclic redundancy check proposed later in discussion of FIG. 17 for the memory data bits will not be operative, additional security in the transmission of these bits may be provided by the generation in parity check block 139 of parity check bits IL5–7.

In yet another preferred embodiment of the illumination detector, greater precision in the expression of the illumination level may be obtained by expanding the number of comparators and by introducing an additional data translation block which will convert the results so obtained to a more compact binary expression to replace the non-binary expression produced by the circuit of FIG. 15.

Figure 16:
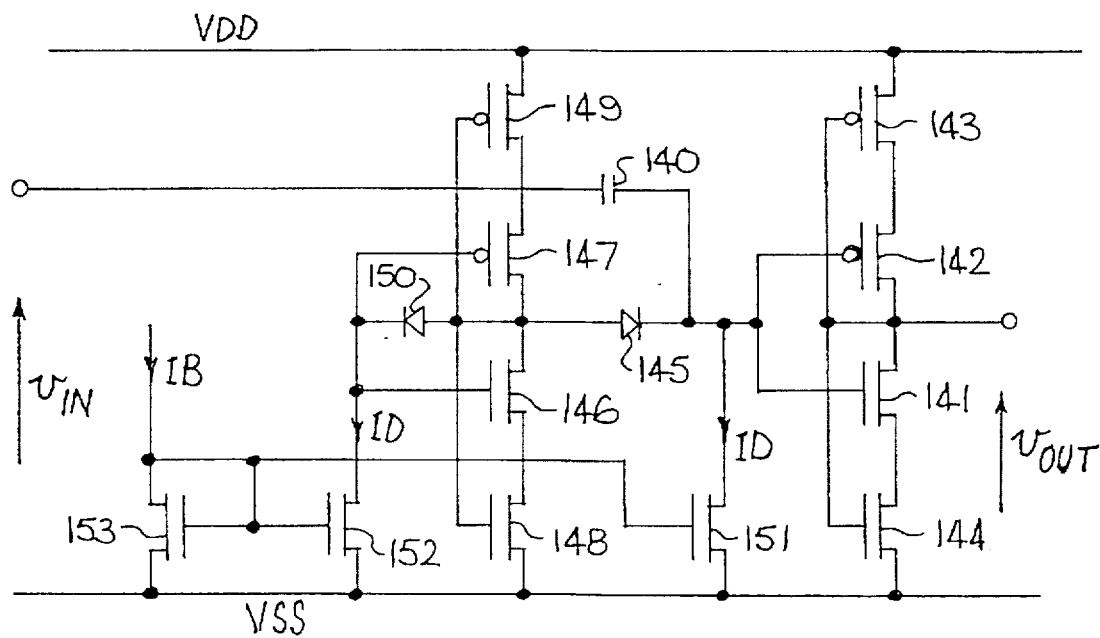
FIG. 16 shows the schematic circuit for one form of ac coupled amplifier useful in label programming circuits.

A preferred embodiment of the ac amplifier 79 used in the data and clock recovery module 32 is shown in FIG. 16. In this circuit the input signal is conveyed by ac coupling capacitor 140 to a controlled-gain amplifier stage containing gain transistors 141 and 142, and may additionally contain degeneration transistors 143 and 144. The dc operating point of this amplifier may be defined through the provision of a very high resistance path through slightly forward biased diode 145 to a voltage reference provided at the junction of transistors 147 and 148. This reference voltage is derived from a second transistor array containing transistors 146, 147, 148 and 149, similar to the amplifying transistor array discussed above, but in which the output is connected back to the input through another slightly forward biased diode 150. The result is the provision of a self-adjusting voltage reference suitable for biasing the above described amplifier stage. The bias currents through transistors 145 and 150 are provided by transistors 151 and 152 which derive their bias by current mirror techniques from transistor 153, itself fed with a bias current IB which may be derived, again by current mirror techniques, from one of the bias supplies VBN of VBP provided as shown in FIG. 9 by mode control block 26.

The advantage of using a circuit involving degeneration transistors 143 and 144 is that a highly predictable ac amplifier gain may be obtained. The advantage of using the bias network shown involving slightly forward biased diode 145 is that with a diode bias current in the tens of picoamp region, an effective forward resistance of the diode in the Gohm region may be obtained, so that an ac amplifier low-frequency time constant of suitably low value may be obtained with only a small area devoted to realising the ac coupling capacitor 140. The advantage of deriving the operating point for the amplifier by providing a high resistance path to a voltage reference provided by a separate but matching, self-adjusting through unity feedback, stage in the way shown is that a correct amplifier operating point will be obtained in the face of significant process variations.

Preferred embodiments of the reply signal modulation system and reply message construction are illustrated in FIGS. 17a and 17b. In these embodiments, in the construction of the reply signal, the reply carrier clock frequency is generated by reply carrier clock oscillator 29 shown in FIG. 4 and which may be counted down by a factor of four in bit rate generator 30 also shown in FIG. 4 to create a series of reply bit intervals. Within each reply bit interval the reply carrier clock frequency is set to one of the two possible values which the oscillator 29 can produce under the control of the Modulation Frequency Select signal MFS shown in FIG. 4.

The first part of a reply signal is considered to be a flag which indicates the start of a reply message and may provide an opportunity for decoding circuits within the interrogator to be initialised. During that first part of the reply transmission period the reply carrier clock may be set to the higher of its two possible values. During transmission of the message structure, shown in FIG. 17b and to be discussed in more detail below, the frequency chosen for each four-cycle group of the reply carrier clock output will, if a binary one is being transmitted, be the same as the frequency for the preceding four cycles, while if a binary zero is being transmitted, the frequency will be the alternate value. The resulting waveform for the transmission of several bits is illustrated in FIG. 17a.

FIG. 17b illustrates in this preferred embodiment the sequence of a total 104 binary digits, labelled 0–103, which may be transmitted in a complete message. The message may commence with a flag of eight or more binary one bits; in this example sixteen bits are chosen, and are marked as F in positions 1–15 in FIG. 17b. For the first flag bit, a choice of the higher modulation frequency is made; all fifteen following flag bits retain this frequency. Then follow eight groups of eight bits drawn from the memory. The first of these bits, marked as Z in FIG. 17b will be a binary zero and will thus trigger a change in modulation frequency. In the following seven groups of eight bits which are transmitted, the first bit in each group, collectively marked as A1–A7 in FIG. 17b, is called an adjustment bit. In one preferred embodiment of this message structure this bit may be set to a binary zero. This setting ensures that a flag sequence of eight or more bits will be unambiguously detected, and also aids in recovery or the bit rate in the receiver section of the interrogator.

In another preferred embodiment of the message structure the adjustment bits may be set to binary zero if there are no zeros in the equally surrounding fourteen data-carrying bits, and may be set to either one or zero if there is a zero in both the preceding seven and succeeding seven data carrying bits, the choice in this case being made on the basis of adjusting all message lengths to be as near as practicable to a common value.

Discussion so far has allocated a function to eight of the sixty-four bits which follow the flag. Of the remaining fifty-six, in the preferred embodiment illustrated in FIG. 17b the allocation is in serial order: data bits D0–D3 drawn from memory, cyclic redundancy check bits C0–C7 drawn from memory, program inhibit bits I1–I6 drawn from memory, and further cyclic redundancy check bits C8–C15.

Following the transmission of the adjustment A8 at position 80 at FIG. 17b, there may be transmitted seven tag field bits T1–T7. In the preferred embodiment being discussed here these bits may represent the strength of the auxiliary illumination signal, i.e., bits IL1–IL7 from FIG. 14, and may represent this signal by mixture of data bits and parity check bits possibly forming an error connecting code. The message structure ends with the transmission of at least eight trailing flag bits an set to binary one. In the preferred embodiment illustrated here sixteen trailing flag bits shown as F in positions 88–103 in FIG. 17b are transmitted.

The message structure defined here provides many benefits. One is that a flag of eight or more bits allows the unambiguous identification of the start of message, and providing more than eight bits for the flag may allow for this identification in the face of some loss of data in the initial message-receiving operation conducted within the interrogator. The regular interpretation of the zero bits or the adjustment bits aids in the recovery of the bit rate clock information within the interrogator. The use of a sixteen-bit cyclic redundancy check provides very great security in the determination of the essential aspects of the reply data.

The benefit of including program inhibit bits, which may be possibly additionally used as concealed control bits for a programming key, are that firstly labels may be made without attention to bringing the initial contents of the reply memory to a known state, considerable manufacturing economy resulting, and that security against unauthorised re-programming may be applied either by preventing any further re-programming by setting all of the programming inhibiting bits to a high level, or by allowing them while not all being at a high level them to control from invisible data from within the tag the generation of an apparently unpredictable programming password. Further advantages in the message structure lie in the addition of tag-field bits which assist in the determination of label position.

Figure 18:
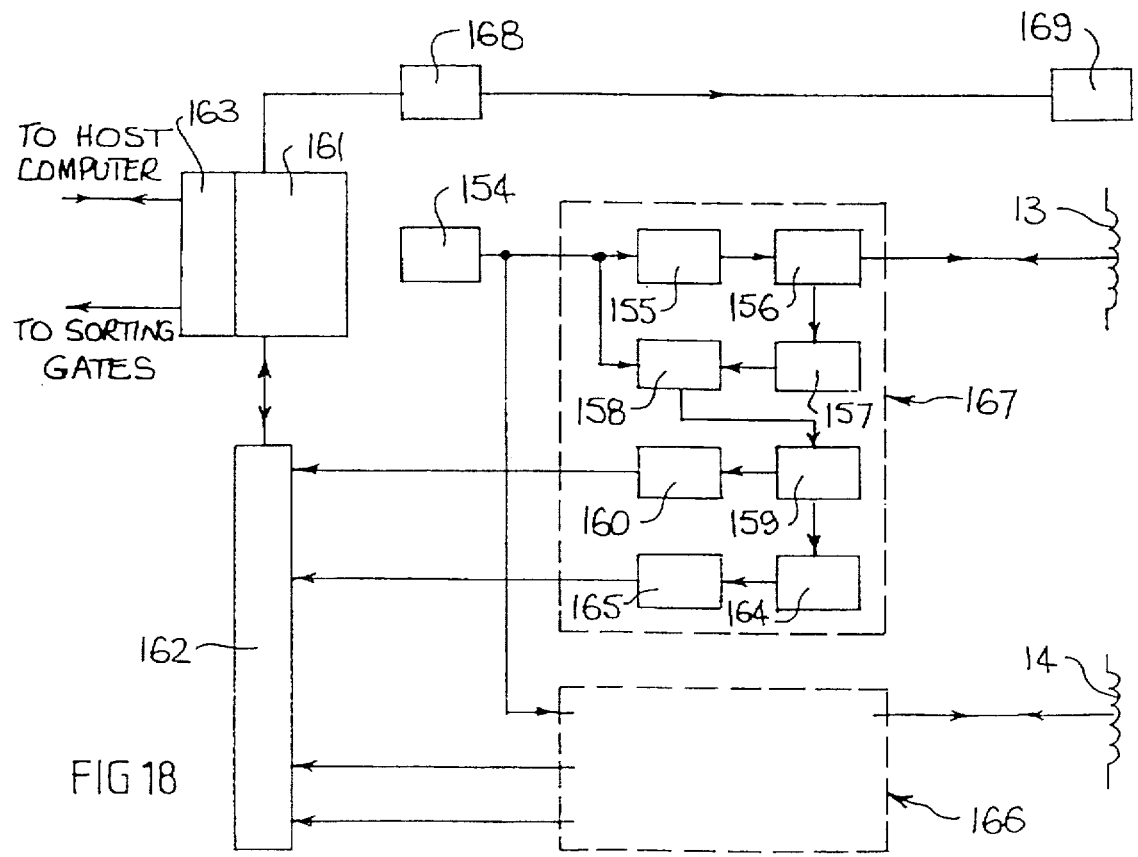
FIG. 18 shows a block diagram of one form of label interrogator.

A block diagram of a preferred embodiment of the interrogator 1 shown in FIGS. 1 and 2 is provided in FIG. 18. The interrogation signals originate in interrogator master oscillator 154 and may be further amplified in transmitter power amplifier 155 and passed via signal separator 156 to primary field creation system 13. That field creation system may also act as the reply field detection system and conveys the reply signal back through the signal separator 156 to interrogator composite filter 157 which may perform the dual tasks of providing high attenuation at the interrogation frequency to reject strong interrogation signals not fully removed by the signal separator, and the selection of one of the two reply frequency sidebands which surround the interrogation frequency and are generated by the modulation process in the label.

The advantage of the selection of a single reply-signal sideband in the composite falter 157 is that potential null responses in the balanced mixer output which can arise from particular phase relationships between the signals reaching the local oscillator and signal ports of the balanced modulator are avoided.

The selected reply side band is conveyed with or without amplification to doubly balanced mixer 158 of which the local oscillator port may be fed from the master oscillator 154. The low frequency output may be amplified in linear amplifier 159 and made available to amplitude detection system 160 the output of which is conveyed to interrogator microcontroller system 161 via multiple port interface 162. The interrogator microcontroller system may take regular samples of the amplitude of each reply and store those amplitudes, together with the time at which they were obtained and the results of their decoding by processes shortly to be discussed, in reply profile memory 163.

The output of the linear amplifier 159 may be also conveyed to limiting amplifier 164 wherein the phase information is preserved, amplitude information is lost, and small signals are suppressed. The output of the limiting amplifier is conveyed to phased-locked loop 165 which develops an output signal representative of the instantaneous value of the reply carrier clock frequency. That output signal may be conveyed to multiple port interface 162 and regularly sampled by the microcontroller system. The microcontroller system 161 may programmed to examine variations in the analogue representation of the in reply carrier clock frequency received by the multiple port interface 162 and to decode those to obtain a digital representation of the entire reply signal.

The advantage of employing a limiting amplifier in the interrogator, and angle modulation of the Reply Carrier Clock signal RCC in the label, is that the effect of interfering replies which may overlap in time with a given reply but are of smaller amplitude is suppressed, and correct reading of the stronger reply can be effected despite the overlap.

During the operation of the interrogator, more that one label may be present in the interrogation field. For the most part, the replies from different labels may occur without overlap in time and will be separately measured in amplitude and decoded, time-stamped and recorded. For the time that each label is within the interrogation field a sufficient number of replies will have been obtained for a clear representation of the profile of reply strength of each separate label as it moves through the interrogation field to have been obtained and recorded in the reply profile memory 163.

While replies from a label continue to be received, report of the label identity to external systems may be deferred. When however replies from a label have ceased, the reply profile may analysed in interrogator microcontroller system 161, the analysis being conducted in the light of the known field configurations within the field creation structure, and from that analysis a position of the label on the conveyor is inferred. After the positions of all labels whose reply profiles have overlapped in time with the reply profile of a particular label have been determined in this way, the extracted label data may be reported to external systems in the order in which labels have been determined to lie on the conveyor, and possibly with an indication of label position.

For the determination of label position in this way use may be made of signals generated and received by a secondary field creation system 14, the reply signal from which is passed to secondary processing circuits 166 which contain contents which duplicate the group of primary processing circuits 167 shown in the FIG. 18. The output signals from the secondary processing circuits may be also passed to the multiple port interface 162 and provide an additional set of decoding signals and additional reply profile both of which assist in the determination of label position.

In the analysis of each of the primary and secondary reply profiles, use may also be made of particular bits within the reply which indicate through mechanisms discussed earlier when the label within the auxiliary illumination field created by the auxiliary illumination system shown in FIG. 2 as item 17, and shown in FIG. 18 as item 169 driven by auxiliary illumination energiser 168.

The advantage of the inclusion within the interrogator of the reply profile memory and of the analysis of the strength of reply profile is that it is possible after analysis to state the order in which simultaneously replying labels lie on the conveyor.

Figure 19:
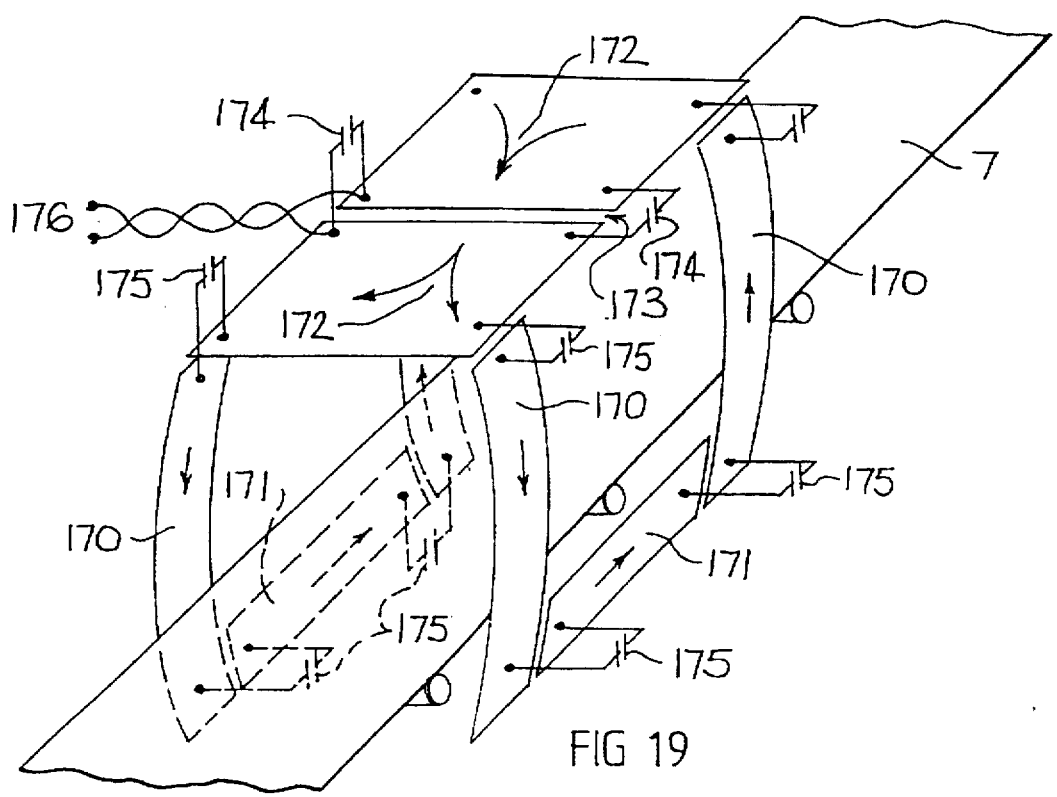
FIG. 19 shows another form of field creation and detection structure useful in label interrogation.

An illustration of the interrogation field creation system different from that shown in FIG. 2 is provided in FIG. 19. In this structure a magnetic field which is substantially transverse to the direction of travel of the conveyor is created by currents which flow on vertical conducting plates 170, lower horizontal conducting plates 171 and common top conducting plate 172 in which there is a gap 173 to provide a feed point. The inductance of the structure may be tuned by parallel capacitors 174 placed across the gap and further series capacitors 175 placed at points distributed over the current path. The structure may be fed with interrogation energy but via balanced feed line 176 connected across the gap. The vertical legs may be bowed outwards to increase the gap between themselves and the conveyor and the conveyor supporting rollers as they pass down through that height. The structure may act as a combined interrogation field creation structure and reply field detection structure.

In the embodiment shown the structure has the advantage of relative immunity from electrical noise generated by the motion of the conveyor and its support rollers in the field. This immunity is achieved by the shaping of the antenna to avoid close approach between the strongest fields which are adjacent to the metal conductors of the field creation structure and the moving parts of the baggage transportation system, and also by the distributed nature of the tuning capacitance which has the effect of avoiding the build-up of charge on particular parts of the conductors which would have occurred if tuning capacitances were omitted or were all placed at one point, with the subsequent generation of electric fields which have the disadvantage of radiating electrical interference to other users of the spectrum and also, through the mechanism of reciprocity, showing a capacity to receive interfering signals from such other users. The distributed nature of the capacitance may also provide a convenient impedance transformation so that the impedance presented to feed line 176 may be somewhere between the inconvenient simple series and simple parallel resonant impedances which are associated with the inductance of the structure.

The structure may also through the use of a common conductor in the top plate 172 achieve a means of tightly coupling the tuned circuits which would be otherwise present in the use of separate coils on each side of the conveyor, with the benefit of removing spurious resonant frequencies to a frequency region far from the interrogation frequency, and thus simplifying tuning operations. The structure also provides a means of constraining the magnetic flux created to more directly cross the conveyor without making premature return, with the benefit of achieving higher interrogation flux density. The field creation and detection structure shown has also the advantage that it may be simply fitted to an existing conveyor installation without any modifications being required thereto.

Figure 20A:
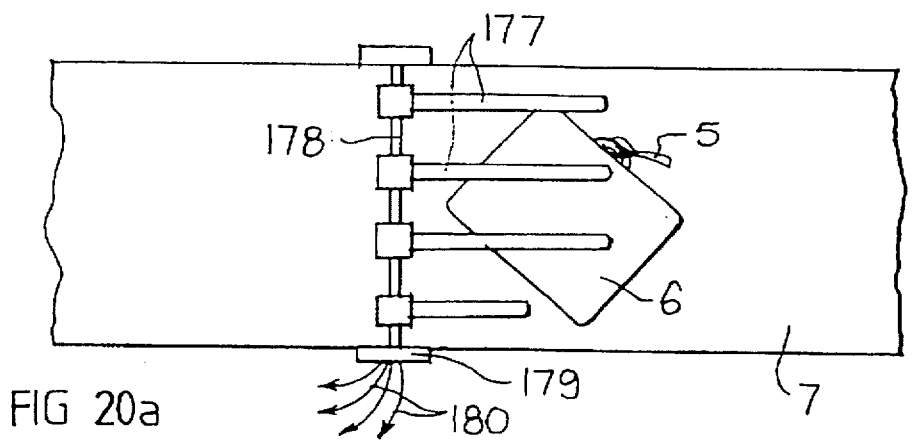
FIG. 20 shows a localised-field interrogation field creation and detection structure useful in label interrogation.
Figure 20B:
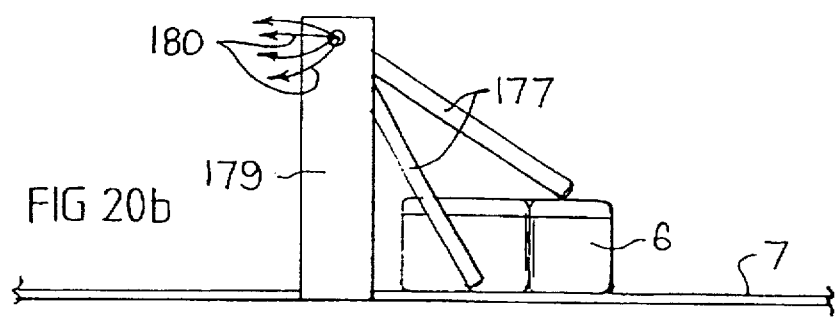

An illustration of yet another preferred embodiment of a interrogation field and creation and detection structure is provided in FIG. 20. In this structure the interrogation field is created by a series of inductors with large length to diameter ratio placed towards the ends of rigid of flexible fingers which may be mounted with freedom to rotate about axle 178 supported on vertical support 179. The luggage scanning fingers may be spring-loaded or may fall under gravity towards the conveyor 7 and are raised by baggage items 6 passing through them. Each field creation inductor may also serve as a reply field sensing inductor and may be individually connected to the interrogator through the group of connections 180. In the interrogator the reply signals from the reply sensors may each be separately processed by individual secondary processing circuits 166 so that a reply strength profile may be recorded for each of them and luggage position on the conveyor more accurately determined.

The structure described in this embodiment has the advantage that radiation of electromagnetic fields from the reasonably short inductors to create interference with other users of the electromagnetic spectrum is small and that the short range fields allow label position determination with increased accuracy.

Figure 21:
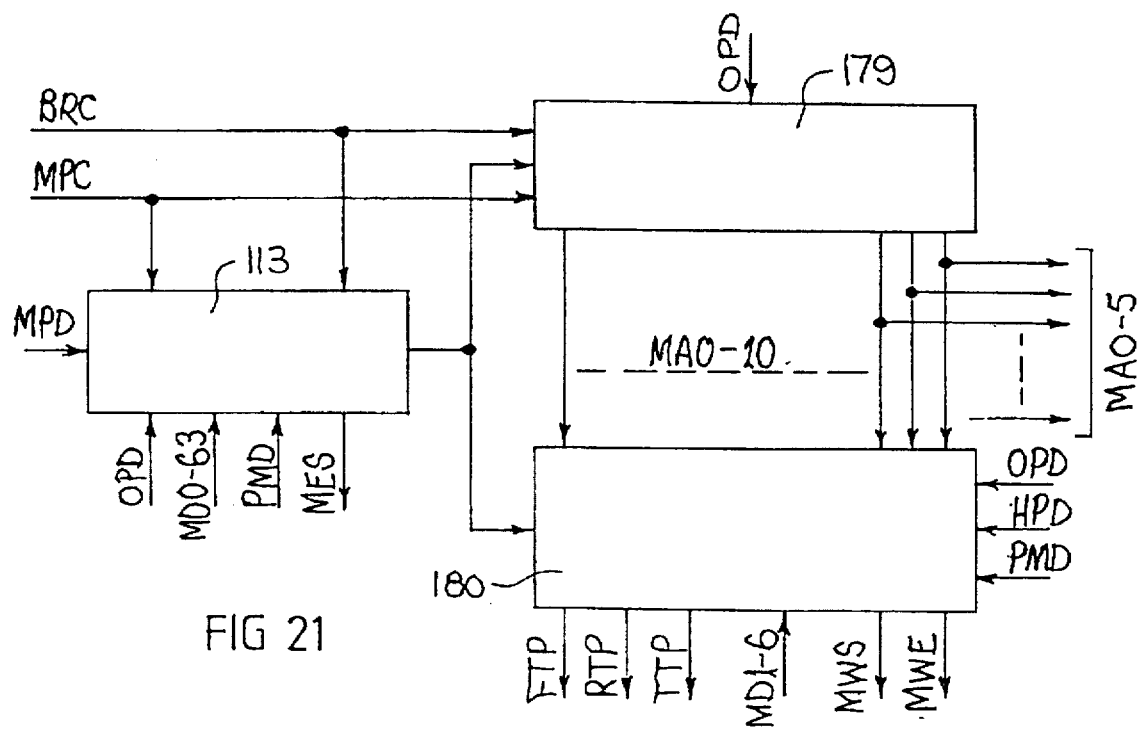
FIG. 21 shows an another form of state control machine used in a form of programmable coded label.

Another preferred embodiment of the state control machine 31 is illustrated in block diagram form in FIG. 21. This embodiment differs from that shown in FIG. 13 in that the six-bit counter 111 therein has been extended to a larger counter 181 of length which may be eleven bits. The six least significant bits continue to provide the six memory address lines MA0–5, but the entire eleven bits are transmitted to a modified state control decoder 182. This decoder may in reply mode issue a reply signal only for counts 0 to 103 and may then ensure that the tag normally falls silent for subsequent counts of 104–2047. The counter 181 cycles continuously through all counts without there being a need for its counting to be initiated by a reply rate oscillator 28 which in this embodiment may be omitted from the label circuit.

In this embodiment the state control decoder 182 may also make use of the High Power Detect signal HPD produced by the mode control block 27 to ensure that when only normal interrogator power is detected, i.e., the HPD signal is is low, a reply signal is provided not only for counts of 0–103 and also counts of 1024–1127, i.e., when the eleven-bit counter is entering the upper half of its counting range. When the High Power detected signal HPD goes high, a reply signal is provided only at the beginning of full counting range of the eleven-bit counter 181.

In this preferred embodiment, so that reply signals from several tags simultaneously present in the field will show the operating voltage dependence which is desirable for overlapping replies rapidly to become separate, the sub-carrier oscillator 29 used in this embodiment may have the dependence of its frequency upon operating voltage enhanced by exploiting a mixture of the techniques discussed in relation to FIGS. 11 and 12.

Figure 22:
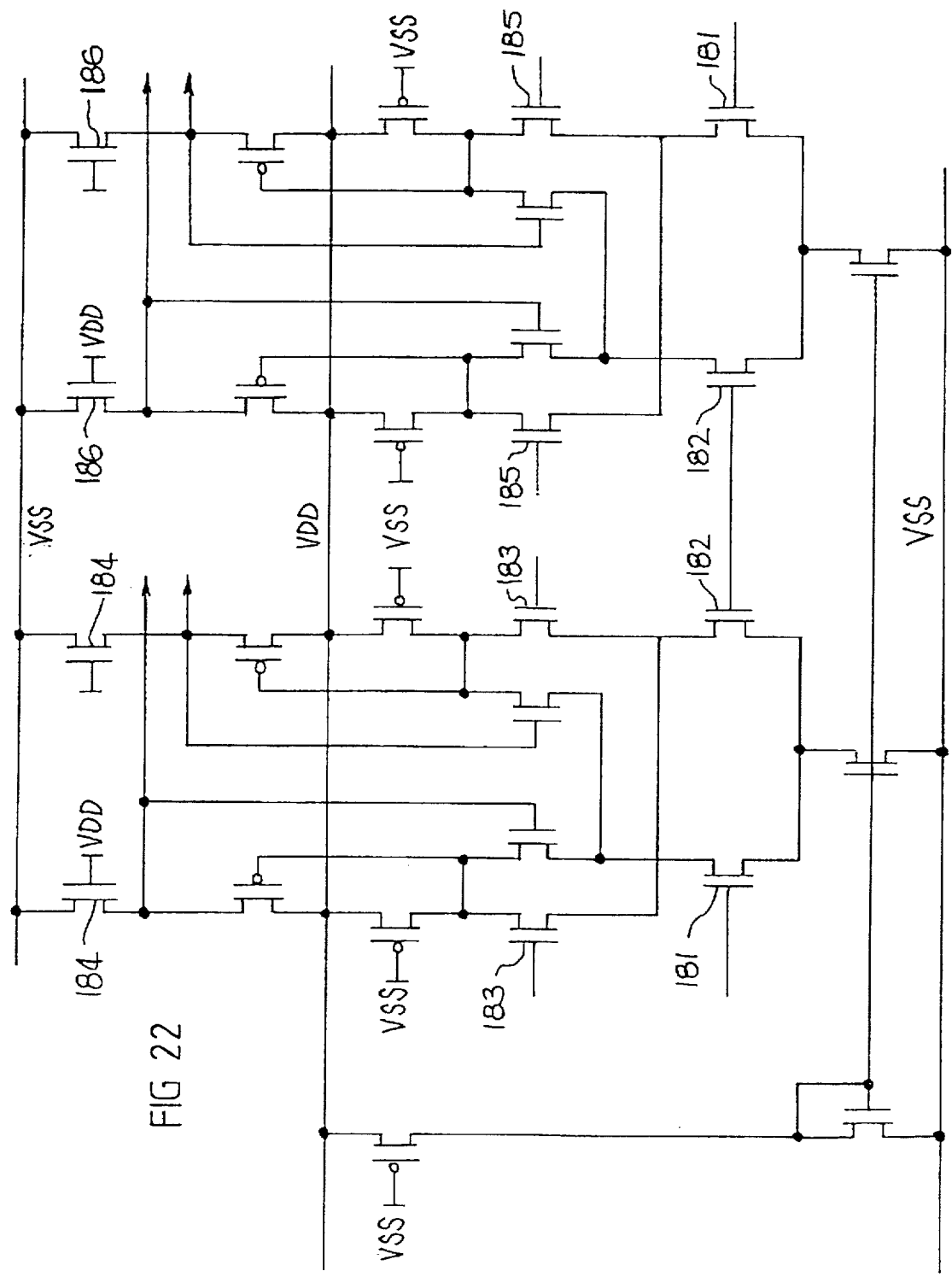
FIG. 22 shows a schematic diagram of a form of high speed and noise-avoiding counter circuit used in a coded label.

In yet another preferred embodiment of the label circuit the reply sub-carrier frequency may be derived from the interrogation frequency by programmed count down circuits. A preferred embodiment of a counter capable of operating at the high interrogation frequency at modest supply voltage is provided in FIG. 22. The circuit takes the form of a clocked master-slave differential flip flop with clock signals at the two nodes marked 181, complementary clock signals at two nodes marked 182, master data input and its complement at the two nodes marked 183, master data output and its complement at the two nodes marked 184, slave data input and its complement input at the two nodes marked 185, and slave data output and its complement at the two nodes marked 186. The circuit functions as a binary divider if the master data outputs are connected to the slave data inputs and the slave data outputs are fed back to master data inputs.

The circuit shown has the advantage that, being based on current switching with minimal voltage excursions at the controlling nodes, only small capacitive charge and discharge currents are required and high switching speed is obtained. The circuit also has the advantage that as all switching stages are balanced minimum power supply ripple results. This latter feature is of benefit not only in providing high speed switching in the currently discussed embodiment, but in other embodiments where counting is maintained during the label period of silence and it is desired that there be minimum load variations at the reply carrier clock frequency presented to the rectifier, so that labels intended to be silent do not radiate spurious signals in the passband of the interrogator reply detecting circuits.

Figure 23:
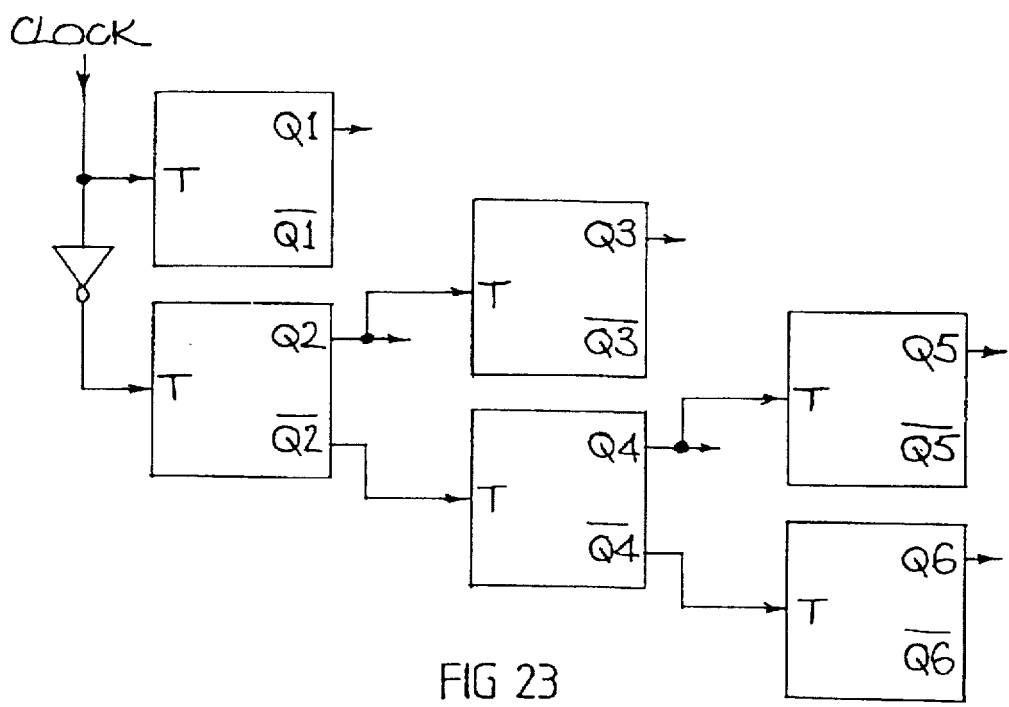
FIG. 23 shows a block diagram of another form of noise-avoiding counter circuit used in a coded label.

Yet another preferred embodiment of a counter circuit which produces minimum power supply ripple is shown in block diagram form in FIG. 23. This counter which produces a Gray coded output avoids the large transients on power supply voltages produced by binary counters wherein at certain counts many of the counter elements toggle at once. The advantage of using this counter are that power supply reservoir capacitors as required for successful operation of the label circuit can be made smaller with consequent significant economies in label production costs.

It will be appreciated that various alterations, modifications and/or additions may be introduced into the constructions and arrangements of parts previously described without departing from the spirit or ambit of the present invention.

We claim:

1. An identification and telemetry system comprising:

a transmitter for generating an interrogation signal and a receiver for detecting and decoding a reply signal;

an interrogation field creation means for generating, within a scanned region, from said interrogation signal, an interrogation electromagnetic field through which an object possessing a code responding label may pass;

an auxiliary illumination system for generating within said scanned region an auxiliary illumination field;

a code responding label including a receiving antenna for receiving from the interrogation electromagnetic field a label interrogation signal, and sensing means for receiving from the auxiliary illumination field an aux-iliary illumination signal, microcircuit means for generating from information stored within the label and from said auxiliary signal a label reply signal, and means within the label for generating from the label reply signal a label reply electromagnetic field; and a receiver antenna connected to said receiver for receiving from the label reply electromagnetic field a system reply signal;

said label reply signal containing information indicative of the auxiliary illumination signal detected by the label.

2. An identification and telemetry system as claimed in claim 1 wherein the auxiliary illumination field is well collimated as to spatial extent.

3. An identification and telemetry system as claimed in claim 2 wherein the auxiliary illumination field comprises an electromagnetic field within one of the ultra-violet, visible, infra-red and microwave regions.

4. An identification and telemetry system as claimed in claim 1 wherein said sensing means uses a photoconductive medium.

5. An identification and telemetry system as claimed in claim 1 wherein said sensing means is disposed within the microcircuit means.

6. An identification and telemetry system as claimed in claim 1 wherein the label reply signal contains information indicative of whether the label has or has not passed through the auxiliary illumination field.

7. An identification and telemetry system as claimed in claim 1 wherein the label reply signal is enabled only when said auxiliary illumination signal is detected by the label.

8. An identification and telemetry system as claimed in claim 1 wherein the label reply signal is disabled when said auxiliary illumination signal is detected by the label.

9. An identification and telemetry system as claimed in claim 1 wherein modification of said label reply signal produced as a result of the auxiliary illumination signal is used to determine relative positions of labels which are simultaneously present within the scanned region.

10. An identification and telemetry system as claimed in claim 1 wherein the label reply information contains a label memory data field and a label reply tag field, said tag field containing information describing the auxiliary illumination signal detected by the label.

11. An identification and telemetry system as claimed in claim 1 wherein the label reply signal contains information indicative of the strength of the auxiliary illumination field.

12. An identification and telemetry system as claimed in claim 10 wherein the label memory data field contains a cyclic redundancy check and the label reply tag field contains at least one parity check.

13. An identification and telemetry system as claimed in claim 1 wherein each interrogation antenna comprises a short range magnetic dipole mounted so as to be able to remain in close contact with labelled objects as the objects move through the scanned region.

* * * * *